(12) United States Patent
Fujioka et al.

(10) Patent No.: US 7,312,787 B2
(45) Date of Patent: Dec. 25, 2007

(54) COORDINATE INPUT DETECTION DEVICE AND METHOD FOR ELECTRONIC BLACKBOARD

(75) Inventors: Susumu Fujioka, Kanagawa (JP); Kunikazu Tsuda, Kanagawa (JP); Katsuyuki Omura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 630 days.

(21) Appl. No.: 10/730,602

(22) Filed: Dec. 8, 2003

(65) Prior Publication Data
US 2004/0196258 A1    Oct. 7, 2004

Related U.S. Application Data

(63) Continuation of application No. 09/955,643, filed on Sep. 19, 2001, now Pat. No. 6,762,747.

(30) Foreign Application Priority Data
Sep. 20, 2000   (JP)   ............... 2000-284509

(51) Int. Cl.
*G09G 5/00*   (2006.01)
(52) U.S. Cl. .................. 345/156; 345/158
(58) Field of Classification Search ........... 273/348, 273/317, 371; 345/157, 156, 179, 158, 159–176, 345/177, 178, 183; 178/19.05, 18.09, 18.01, 178/18.03, 18.05, 19.01–19.06; 340/150–153; 463/37
See application file for complete search history.

(56) References Cited

U.S. PATENT DOCUMENTS

| 5,577,733 | A  | * | 11/1996 | Downing ............... 273/348 |
| 6,762,747 | B2 | * | 7/2004 | Fujioka et al. ......... 345/157 |
| 7,113,174 | B1 | * | 9/2006 | Takekawa et al. ....... 345/173 |
| 2003/0206306 | A1 | * | 11/2003 | Omura et al. .......... 356/620 |

* cited by examiner

*Primary Examiner*—Nitin I. Patel
(74) *Attorney, Agent, or Firm*—Knoble Yoshida Dunleavy, LLC

(57) ABSTRACT

An electronic blackboard displays information and optically detects input information on a display/writing surface by determining the corresponding coordinates. To determine the input coordinates, a predetermined number of pairs of light emitting elements and light detecting elements are placed in parallel for each axis near the edges. The light emitting elements and the light detecting elements are also linearly and equidistantly placed. A control unit is connected to the light emitting elements for sequentially activating these light emitting elements and for controlling the light detecting elements to detect the light in an overlapping manner. Based upon the above positional information from the light detecting elements, an input coordinate determination unit determines the input coordinates of an input on the display/writing surface.

18 Claims, 15 Drawing Sheets

| LED NO. | TOR NO. FOR PHOTODETECTION |
|---------|----------------------------|
| LV1     | PV1~PV36                   |
| LV2     | PV1~PV37                   |
| LV3     | PV1~PV38                   |
| ⋮       | ⋮                          |
| LV36    | PV1~PV71                   |
| LV37    | PV2~PV72                   |
| LV38    | PV3~PV73                   |
| ⋮       | ⋮                          |
| LV79    | PV44~PV80                  |
| LV80    | PV45~PV80                  |

| LED NO. | PHOTOTRANSISTOR FOR NON PHOTODETECTION CENTER POSITION NO. |
|---|---|
| 1 | 0 |
| ⋮ | ⋮ |
| 22 | 0 |
| 23 | 57 |
| 24 | 56 |
| ⋮ | ⋮ |
| 40 | 40 |
| ⋮ | ⋮ |
| 56 | 24 |
| 57 | 23 |
| 58 | 0 |
| ⋮ | ⋮ |
| 80 | 0 |

| LED NO. | PHOTOTRANSISTOR NO. FOR PHOTODETECTION |
|---|---|
| LH1 | PH1~PH53 |
| LH2 | PH1~PH54 |
| LH3 | PH1~PH55 |
| ⋮ | ⋮ |
| LH7 | PH1~PH59 |
| LH8 | PH1~PH60 |
| ⋮ | ⋮ |
| LH53 | PH1~PH60 |
| LH54 | PH2~PH60 |
| ⋮ | ⋮ |
| LH59 | PH7~PH60 |
| LH60 | PH8~PH60 |

~60

| LED NO. | PHOTOTRANSISTOR FOR NON PHOTODETECTION CENTER POSITION NO. |
|---|---|
| 1 | 0 |
| ⋮ | ⋮ |
| 22 | 0 |
| 23 | 37 |
| 24 | 36 |
| ⋮ | ⋮ |
| 30 | 30 |
| ⋮ | ⋮ |
| 46 | 14 |
| 47 | 13 |
| 48 | 0 |
| ⋮ | ⋮ |
| 60 | 0 |

~61

COORDINATE INPUT DETECTION DEVICE AND METHOD FOR ELECTRONIC BLACKBOARD

This is a continuation of prior application Ser. No.: 09/955,643 filed on Sep. 19, 2001 now U.S. Pat. No. 6,762,747 under 35 CFR 1.53(b).

FIELD OF THE INVENTION

The current invention is generally related to an electronic blackboard or display board, and more particularly related to a coordinate input/detection unit for the electronic blackboard.

BACKGROUND OF THE INVENTION

Prior art whiteboards or electronic boards allow a user to handwrite on a writing surface such as a sheet using a certain writing instrument, and an onboard scanner scans the handwritten information. Furthermore, the scanned information is later printed on an image-recording medium via a printer. In more recent years, the electronic boards have a coordinates input/detection unit on a writing surface for inputting the hand written information into a computer on a real time basis. For example, Micrographic, Inc. offers an electronic whiteboard with an onboard input/detection unit on the writing surface for inputting the hand written visual data such as characters and pictures into a computer on a real time basis. The same electronic board system allows to display on a cathode ray tube (CRT) or a large screen using a liquid crystal projector the visual data stored in the computer from the electronic board. The visual data is also printed on an image-recording medium. Furthermore, a softboard is connected to a computer, and a computer screen is projected onto the softboard via a liquid crystal projector. A user operates the computer on the softboard.

Another type of electronic board includes a display unit for displaying characters and images; a touch panel/screen or coordinate input/detection unit located in front of the display unit for inputting and detecting the coordinate information; and a control unit for controlling the display unit based upon the input from the coordinate input/detection unit. Based upon the above units, the electronic board provides a display surface and a writing surface. For example, SMART Technologies Inc. offers SMART 2000, which projects characters, pictures, diagrams and graphic images onto a projection panel via a liquid crystal projector that is connected to a computer and inputs into the computer any hand-written information via the coordinate input/detection unit or the writing surface located in front of the projection panel. The hand-written information is then composed with the image information in the computer, and the composed image is again displayed via the liquid crystal projector on a real time basis.

The above described electronic blackboard systems superimpose the image from the coordinate input/detection unit over another image displayed on a screen by the display unit. Because of the superimposing feature, the electronic blackboard systems are already widely used in conferences, presentations and education, and the use is evaluated to be highly effective. Furthermore, certain electronic blackboard systems incorporate telecommunication such as audio and video features and provide videoconferencing capability for connecting remote locations via a communication line.

Various types of the coordinate input/detection units have been considered. Among various detection techniques, a coordinate input/detection device using an optical system and involving no physical surface such as a touch panel appears to be promising for the application to the above electronic blackboards. Optical coordinate input/detection devices have been proposed and used with various methods. For example, Carol Touch Co. offers Model 42 plasma display infrared touch panel frame for placing on the Model 42 display. A plurality of light-emitting diodes (LEDs) is placed in rows and columns at equal distance in both horizontal and vertical directions. Similarly, a plurality of phototransistors is placed in both horizontal and vertical arrangements at the same distance. By continuously scanning pairs of a LED and a phototransistor, it is checked if infra red light is interrupted in either X and or Y directions. Upon detecting the interruption of the infra red light, the corresponding coordinates are determined and then outputted to an external device. According to Japanese Patent 2705156, a plurality of pairs of a light emitting element and a light detecting element are placed from the upper left to the lower right as well as from the upper right to the lower left in a diagonal direction. Each of the light detecting elements detects light from two corresponding light emitting elements by time-dividing the detection. Furthermore, according to Japanese Patent 2980286, diffused light from a light source located near a central or terminal one of a single row of light detecting elements is reflected by a holographic reflector located to form parallel light. A plurality of the light detecting elements on the light source side receives the parallel light.

Using a coordinate input detection device such as the above described Carol Touch Inc.'s device having conventional light emitting elements such as LEDs and light detecting elements such as phototransistors, a detection path or line between the light emitting element and the light detecting element is parallel to those of other pairs. For this reason, the input resolution of the input coordinates depends upon the distance between the light emitting element and the light detecting element. In other words, in order to increase the resolution, the distance between the light emitting element and the light detecting element must be reduced. However, there is a limitation in decreasing the above distance, and the resolution cannot be substantially improved.

As described above, Japanese Patent 2705156 discloses that one light detecting element receives light from two light emitting elements by time division. Since the light paths for all of the light detecting elements are parallel in two directions, although there is a difference between horizontal/perpendicular relations and diagonal relations, as described with respect to the Carol Touch device, the resolution on the coordinates still depends upon the size of and the distance between the light emitting element and the light detecting element. For this reason, if a high resolution is required, the conventional coordinate input devices remains to be improved.

As described above, Japanese Patent 2980286 discloses that there is a diffused light path from a single light emitting element towards a holographic reflector in addition to parallel light paths between the holographic light reflector and each of the single row of the light detecting elements. However, the light detecting elements in certain areas near the holographic reflector do not receive light reflected by the holographic reflector. Due to the above area where coordinates are not determined from the interruption of the diffused light, if a high resolution level is required in a large area, the conventional coordinate input devices remains to be improved. That is, in the area near the holographic reflector, the resolution is determined by the placement distance of the light detecting elements. Furthermore, since the interruption of the path between the holographic reflector and the light emitting element or the interruption of the path between the holographic reflector and the light detecting element is detected by the same light detecting element, it is difficult to determine the true interruption position.

Accordingly, the current invention involves a plurality of light emitting and detecting elements that are placed in two directions to cross and surround a two-dimensional coordinate input and detection unit which receives a command from a operational unit so that input coordinates are determined at a high resolution level for the electronic blackboard. The current invention also improves efficiency for the coordinate determination by eliminating any unnecessary calculation processes.

SUMMARY OF THE INVENTION

In order to solve the above and other problems, according to a first aspect of the current invention, method of detecting coordinates based upon two groups of opposing pairs of light emitting elements and light detecting elements, the two groups being perpendicularly positioned along two directions and surrounding a two-dimensional coordinate input and detection area for accepting an input from a pointing means, a plurality of the light detecting elements being placed in a light emitting area of each of the light emitting elements to accept light emitted from each of the light emitting elements in an overlapping manner, including the steps of: sequentially and individually activating the light emitting elements within a predetermined time interval; determining whether or not the light is interrupted along directions between activated one of the light emitting elements and the light detecting elements in the corresponding light emitting area of the activated light emitting element; calculating two-dimensional coordinates for the input from the pointing means based upon the positions of the activated light emitting element and one or more of the light detecting elements that have detected the interruption of the light in the corresponding light emitting area, which define the interrupted light detecting elements.

According to a second aspect of the current invention, a storage medium containing computer instructions for detecting coordinates based upon two groups of opposing pairs of light emitting elements and light detecting elements, the two groups being perpendicularly positioned along two directions and surrounding a two-dimensional coordinate input and detection area for accepting an input from a pointing means, a plurality of the light detecting elements being placed in a light emitting area of each of the light emitting elements to accept light emitted from each of the light emitting elements in an overlapping manner, the computer instructions performing the tasks of: sequentially and individually activating the light emitting elements within a predetermined time interval; determining whether or not the light is interrupted along directions between activated one of the light emitting elements and the light detecting elements in the corresponding light emitting area of the activated light emitting element; calculating two-dimensional coordinates for the input from the pointing means based upon the positions of the activated light emitting element and one or more of the light detecting elements that have detected the interruption of the light in the corresponding light emitting area, which define the interrupted light detecting elements.

According to a third aspect of the current invention, a system for detecting coordinates based upon two groups of opposing pairs of light emitting elements and light detecting elements, the two groups being perpendicularly positioned along two directions and surrounding a two-dimensional coordinate input and detection area for accepting an input from a pointing means, a plurality of the light detecting elements being placed in a light emitting area of each of the light emitting elements to accept light emitted from each of the light emitting elements in an overlapping manner, including: a light emitting control for sequentially and individually activating the light emitting elements within a predetermined time interval; an interruption determination unit connected to light emitting control for determining whether or not the light is interrupted along directions between activated one of the light emitting elements and the light detecting elements in the corresponding light emitting area of the activated light emitting element; a coordinate calculation unit connected to the determination unit for calculating two-dimensional coordinates for the input from the pointing means based upon the positions of the activated light emitting element and one or more of the light detecting elements that have detected the interruption of the light in the corresponding light emitting area, which define the interrupted light detecting elements.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 10 is one example of the vertical light pathways table.

FIG. 11 is an exemplary table for mapping the phototransistors that detect light from each of the LEDs that are vertically positioned.

DETAILED DESCRIPTION OF THE PREFERRED EMBODIMENT(S)

Figure 1:
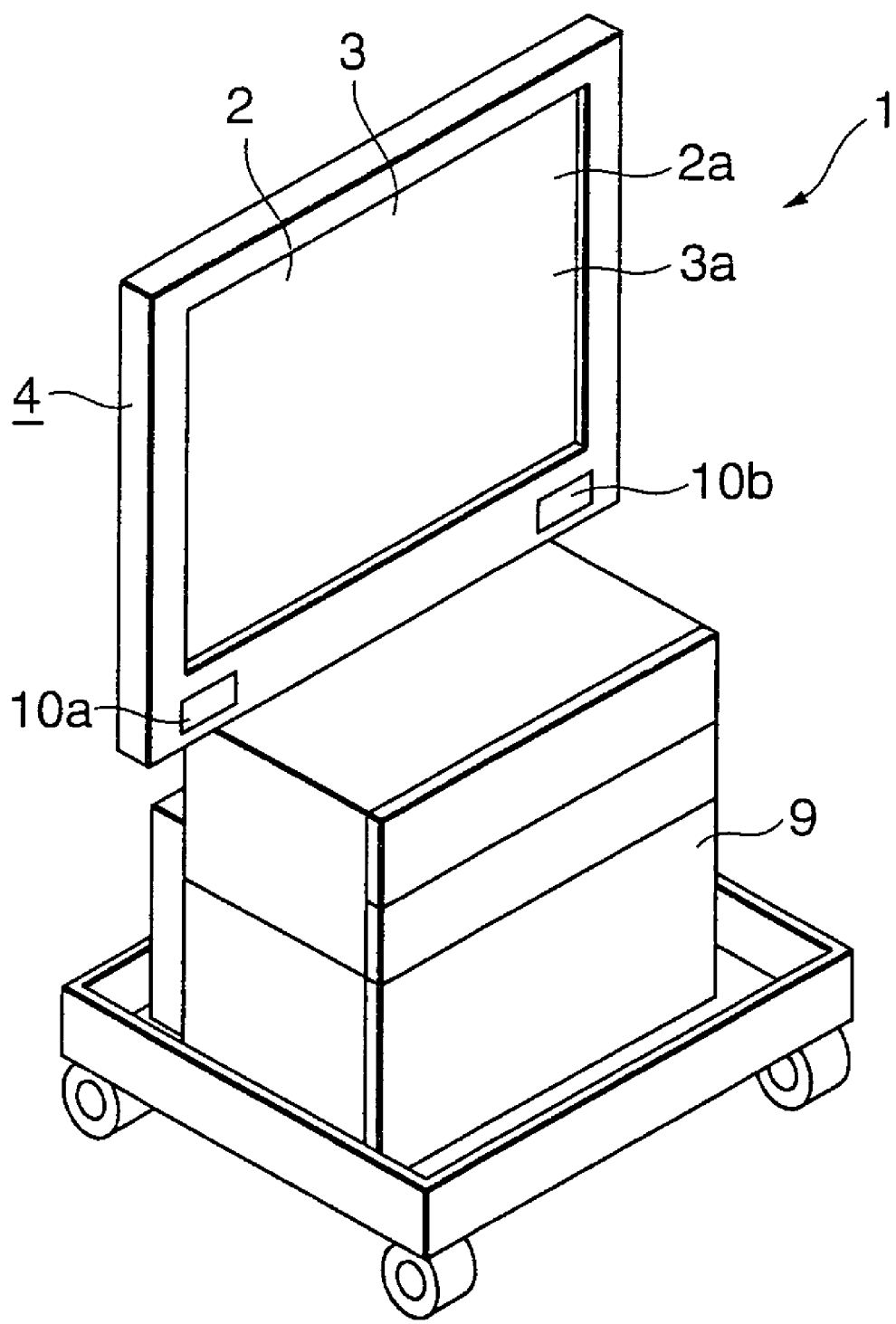
FIG. 1 is a diagram illustrating one preferred embodiment of the electronic blackboard in a perspective view according to the current invention.

Referring now to the drawings, wherein like reference numerals designate corresponding structures throughout the views, and referring in particular to FIG. 1, a diagram illustrates one preferred embodiment of the electronic blackboard in a perspective view according to the current invention. The electronic blackboard or whiteboard system 1 includes an electronic blackboard 4 having a plasma display panel (PDP) 2 and a coordinate input detection unit 3 and an equipment storage unit 9. The equipment storage unit 9 houses a computer 5 such as a personal computer as a control device, a scanner for scanning an input document, a printer for outputting an image data on a recording medium and a video player 2. One example of the plasma display panel 2 is a large screen that is over 40-inch. Although the coordinate input detection unit 3 will be further described in detail, the coordinate input detection unit 3 includes a coordinate input detection frame having a coordinate input detection area 3a where light emitting elements such as infrared light emitting diodes (LEDs) and light detecting elements such as phototransistors are placed around the display screen 2a. Within the coordinate input detection area 3a, when a light detection path is interrupted by a pointing element such as a pen or a fingertip, the optical coordinate input/detection unit 3 determines the pointed positions or the coordinates for inputting information such as characters based upon the location of the phototransistors whose light path is interrupted.

Still referring to FIG. 1, the PDP 2 includes a speaker 10b and a video input terminal 10a for connecting various information or audiovisual devices such as the video player 8, a laer disk player, a DVD player and a video camera so that the PDP 2 is used as a large monitor screen. Although not shown in FIG. 2, adjustment controls are also provided for display position, width and height.

Figure 2:
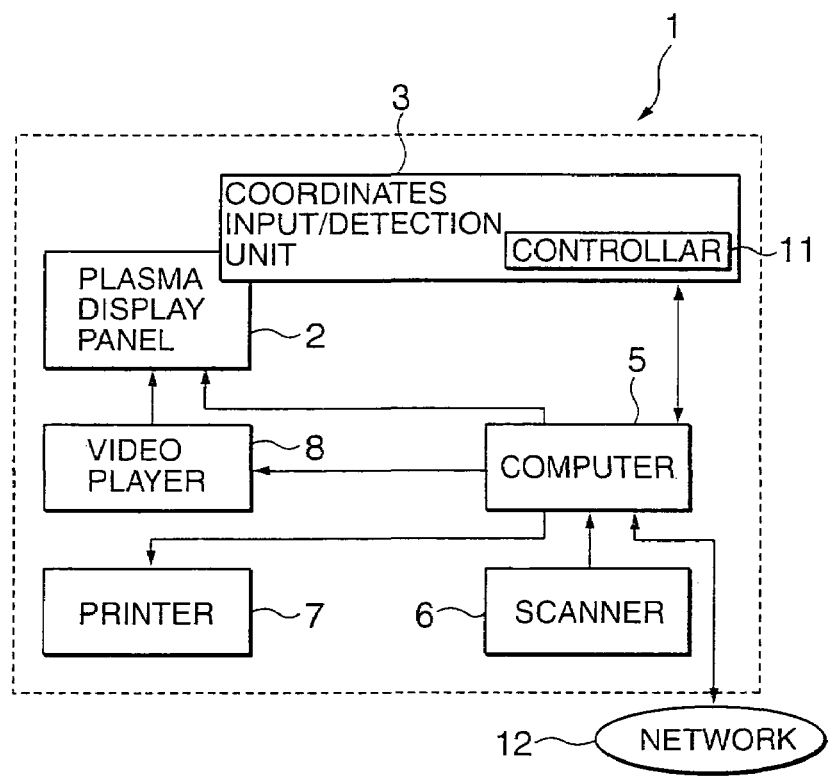
FIG. 2 is a diagram illustrating connections among the internal components or units of the one preferred embodiment of the electronic blackboard system 1 according to the current invention.

Now referring to FIG. 2, a diagram illustrates connections among the internal components or units of the one preferred embodiment of the electronic blackboard system 1 according to the current invention. The computer 5 is connected to the PDP2, the scanner 6, the printer 7 and the video player 8 and controls the entire electronic blackboard system 1. A controller located in the coordinate input detection unit 3 that determines the coordinates within the coordinate input detection area 3a is connected to the computer 5, and the coordinate input detection unit 3 is also connected to the computer 5 via the controller 11. The electronic blackboard system 1 is connected to a network 12 via the computer 5. Through the network 12, the electronic blackboard system 1 receives data from another computer on the same network 12 for displaying it on the PDP or transmits the data generated on the electronic blackboard system 1 to another computer on the same network 12.

Figure 3:
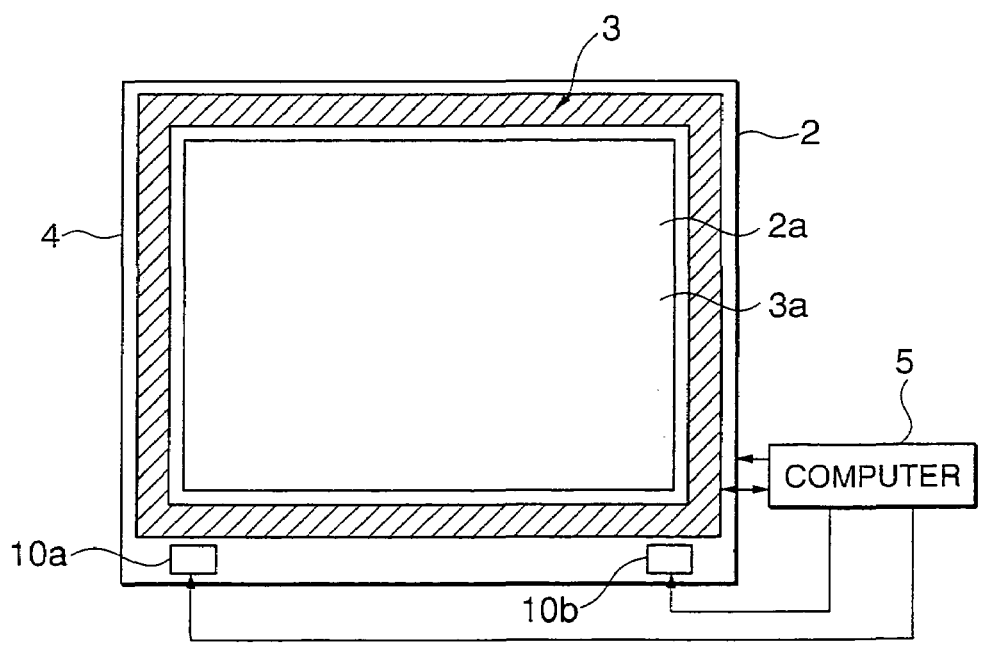
FIG. 3 is a diagram illustrating that a plasma display panel and a coordinate input/detection unit are integrated as a single unit.

Now referring to FIG. 3, the PDP 2 and the coordinate input/detection unit 3 are integrated as a single unit by placing the coordinate input/detection unit 3 on the display screen 2a of the PDP. In other words, the electronic blackboard unit 4 is constructed by approximately matching the display screen 2a of the PDP 2 on the coordinate input detection area 3a of the coordinate input detection unit 3. The electronic blackboard unit 4 includes the PDP 2 and the coordinate input detection unit 3 to form the display screen 2a and the writing input surface 3a. The coordinate input detection unit 3 is matched with the size of display screen 2a of the PDP 2. For example, the coordinate input detection unit 3 is has a ratio of 3:4 for the height-to-width measurement of the coordinate input detection area 3a where characters and diagrams are hand-written for input.

Figure 4:
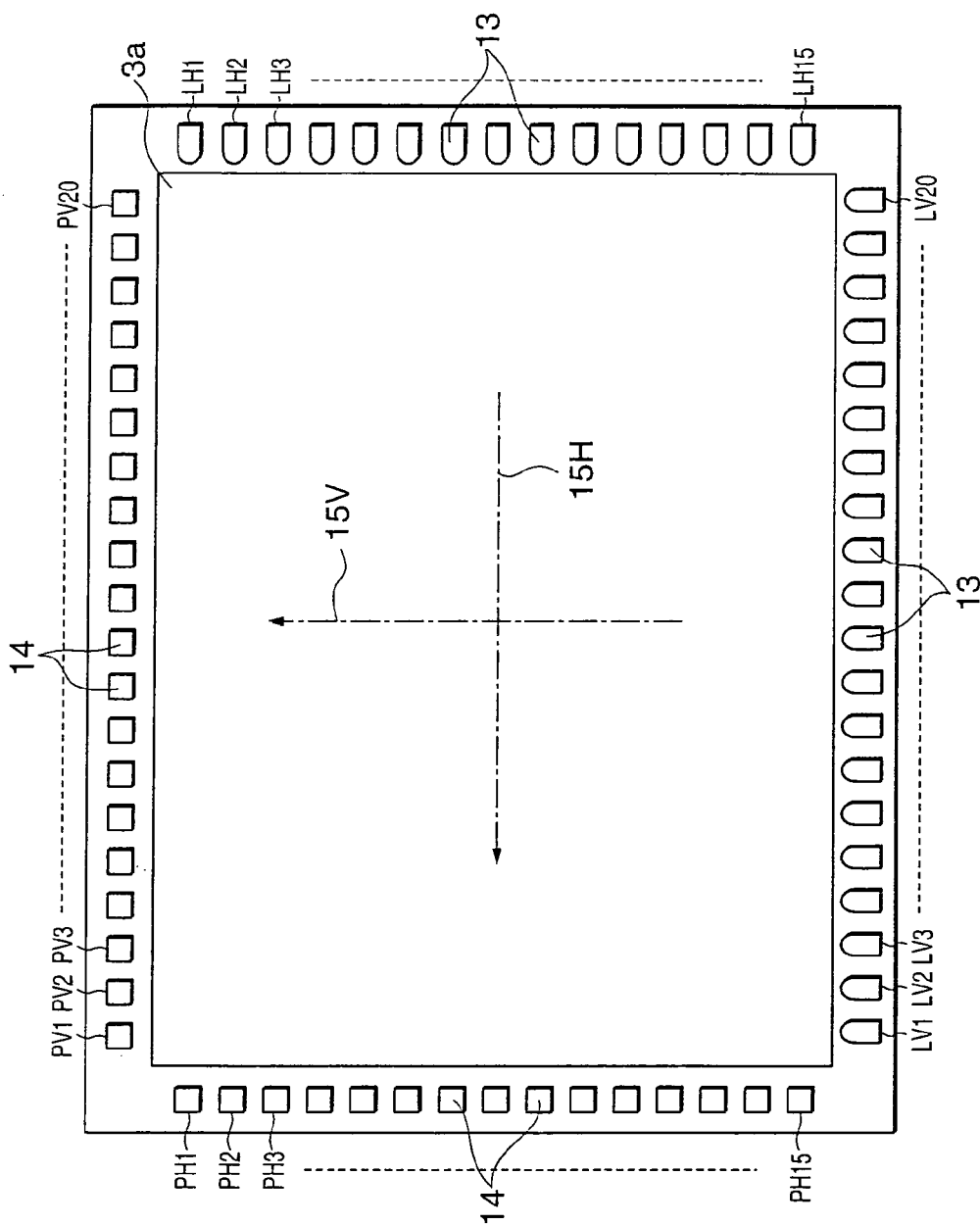
FIG. 4 is a diagram illustrating one exemplary placement of the light emitting elements or LEDs and the light detecting elements or phototransistors in the coordinate input detection unit of the current invention.

FIG. 4 is a diagram illustrating one exemplary placement of the light emitting elements or LEDs 13 and the light detecting elements or phototransistors 14 in the coordinate input detection unit 3 of the current invention. A plurality of the LEDs 13 is placed in a horizontal row at a bottom and a vertical column on a right side of the coordinate input detection area 3a. A plurality of the phototransistors 14 is placed in a horizontal row at a top and a vertical column on a left side of the coordinate input detection area 3a. Within every row or column, the LEDs 13 and the phototransistors 14 are placed at an equal distance. Between the top and the left as well as between the left and the right, a pair of sets of the LEDs 13 and the phototransistors 14 is placed on the opposite sides. From the above described arrangement, two sets of light emitting and detecting elements include a first set 15V of the vertically placed LEDs 13 and phototransistors 14 and a second set 15H of the vertically placed LEDs 13 and phototransistors 14. Because of the equidistant placement of the LEDs 13 and the phototransistors 14, one preferred embodiment as shown in FIG. 4 includes twenty of the LEDs LV1 through LV20 and the phototransistors PV1 through PV20 in the horizontal direction and fifteen of the LEDs LH1 through LH15 and the phototransistors PH1 through PH15 in the vertical direction. However, if the display screen 2a of the PDP2 is larger than forty inches, more LEDs and phototransistors are needed in each direction. Another preferred embodiment has the display screen 2a of the PDP2 of 42 inches and includes eighty of the LEDs LV1 through LV80 and the phototransistors PV1 through PV80 in the horizontal direction and sixty of the LEDs LH1 through LH60 and the phototransistors PH1 through PH60 in the vertical direction.

Figure 5:
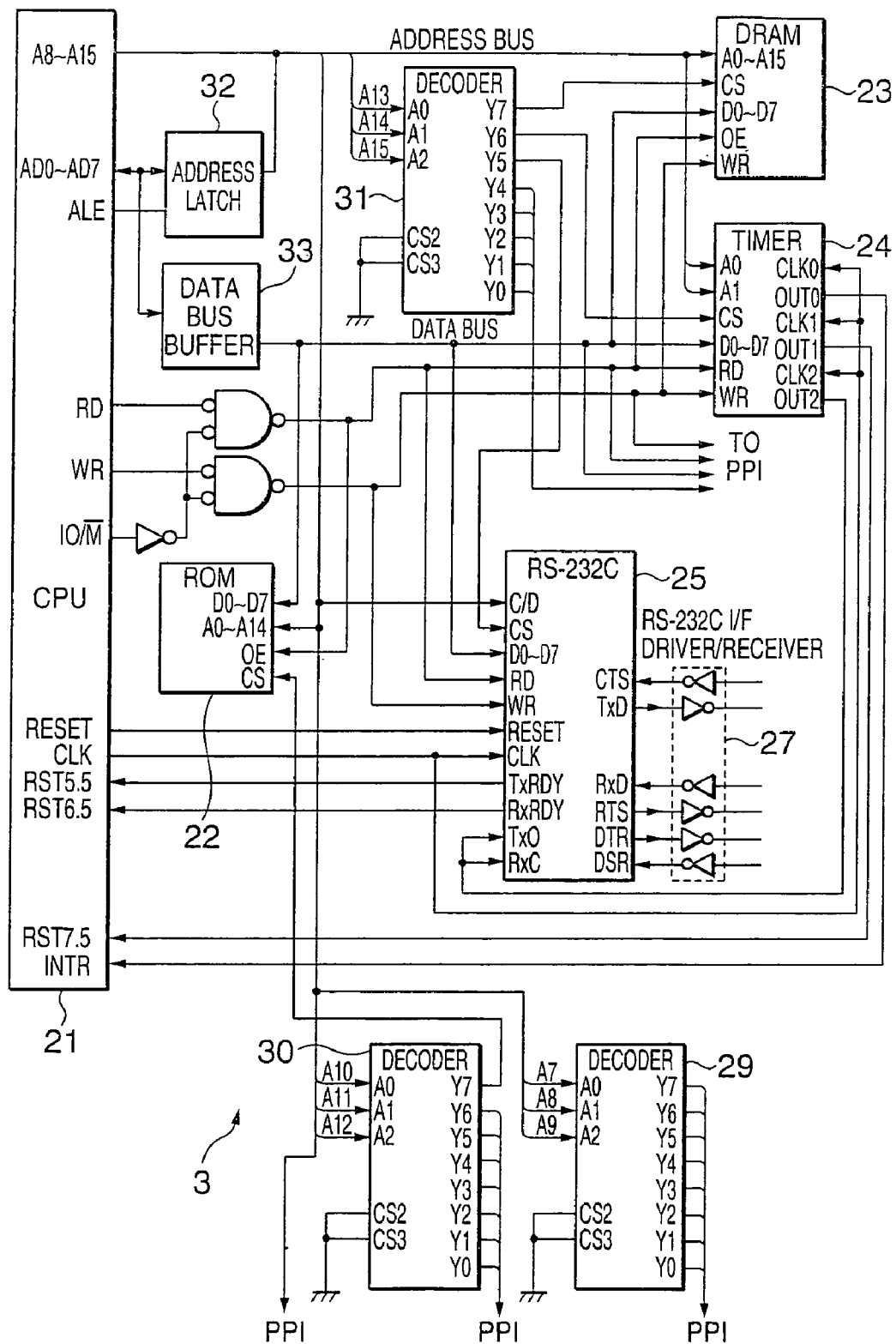
FIG. 5 is a diagram illustrating hardware of the coordinate input detection unit according to the current invention.
Figure 6:
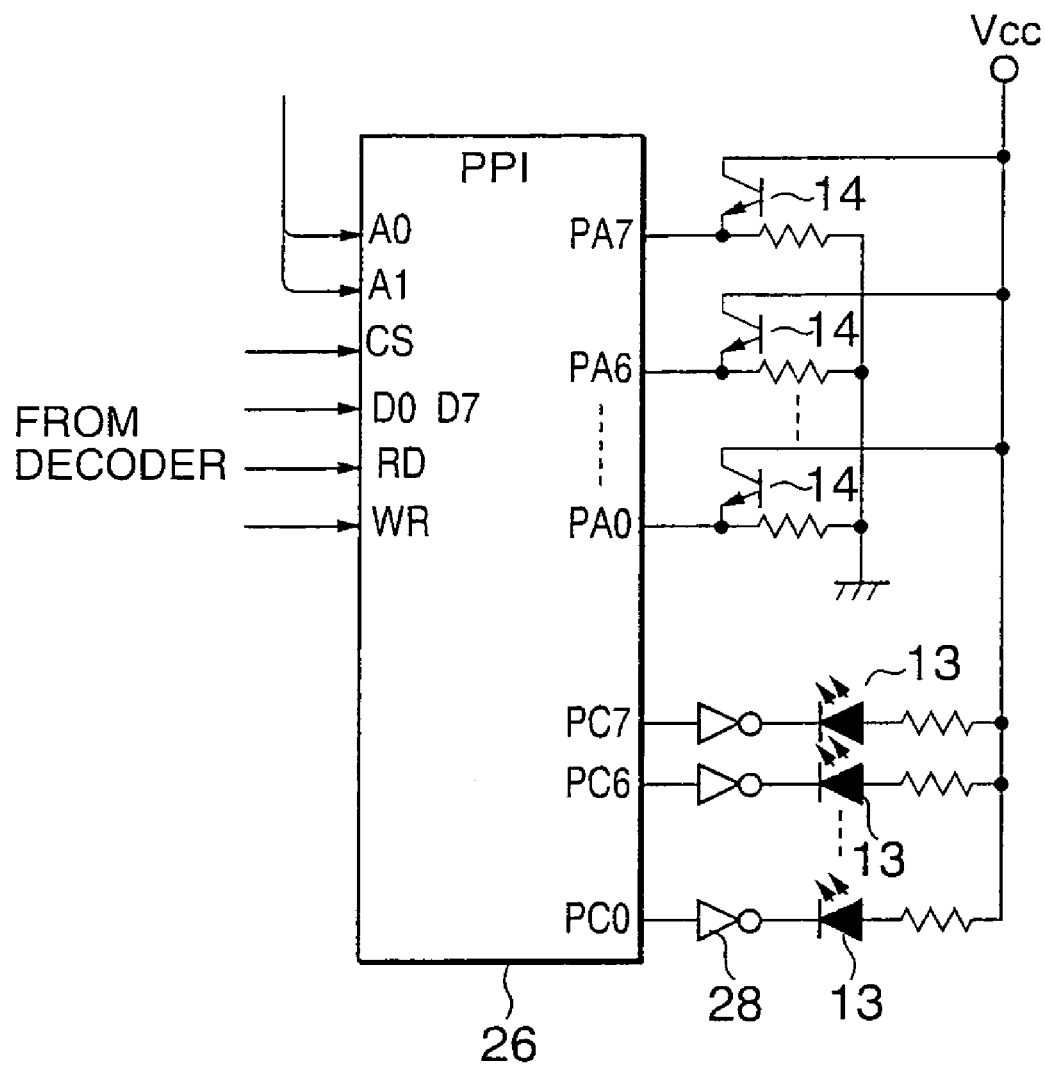
FIG. 6 is a diagram illustrating hardware of the coordinate input detection unit according to the current invention.

Now referring to FIGS. 5 and 6, diagrams illustrates hardware of the coordinate input detection unit 3 according to the current invention. The coordinate input detection unit 3 includes a CPU 21 such as 8085A, a read only memory (ROM) unit 22, a dynamic random access memory (DRAM) unit 23, a timer large-scale integration (LSI) circuit 24 such as 8254, a serial data transmission large-scale integration (LSI) circuit 25 such as 8251A and a programmable peripheral interface (PPI) 26 such as 8255A. The timer LSI circuit 24 has an OUT0 at a predetermined level L for n CLK0 inputs, an OUT1 at the predetermined level L for m CLK1 inputs, and an OUT2 at the predetermined level L for k CLK2 inputs. The serial data transmission LSI circuit 25 performs the data transmission according to the RS-232C standard and is connected to the computer 5 through a RS-232C cable via a RS-232C I/F driver/receiver circuit 27. The PPI 26 is a programmable input/output interface and has three 8-bit input/output ports such as a port PA, a port PB and a port PC.

As shown in FIG. 6, the port PA is used as an input port, and each of input terminals PA0 through PA7 is connected to the phototransistors 14. When the phototransistors 14 detect light, the terminal input reaches a predetermined H level. On the other hand, when the phototransistors 14 fail to detect light, the terminal input reaches a predetermined L level. Furthermore, the port PC is used as an output port, and each of output terminals PC0 through PC7 is connected to the LEDs 13 via inverters 28. When the LED 13 is turned on when the terminal out reaches the predetermined H level. On the other hand, the LED 13 is turned off when the terminal output reaches the predetermined L level. In the preferred embodiment, since hundred forty of the LEDs 13 and hundred forty of the phototransistors 14 are used, eighteen of the PPIs 26 are correspondingly used. One of the eighteen PPIs 26 is connected to four of the LEDs 13 and four of the phototransistors 14, using the input terminals PA0 through PA3 and the output terminals PC0 through PC3. These PPIs 26 are connected to the CPU 21 via the decoders 29, 30 and 31, and one example of the decoders 29, 30 and 31 is 74138. An address latch 32 and a data buffer 33 are also connected to the CPU 21.

Figure 7:
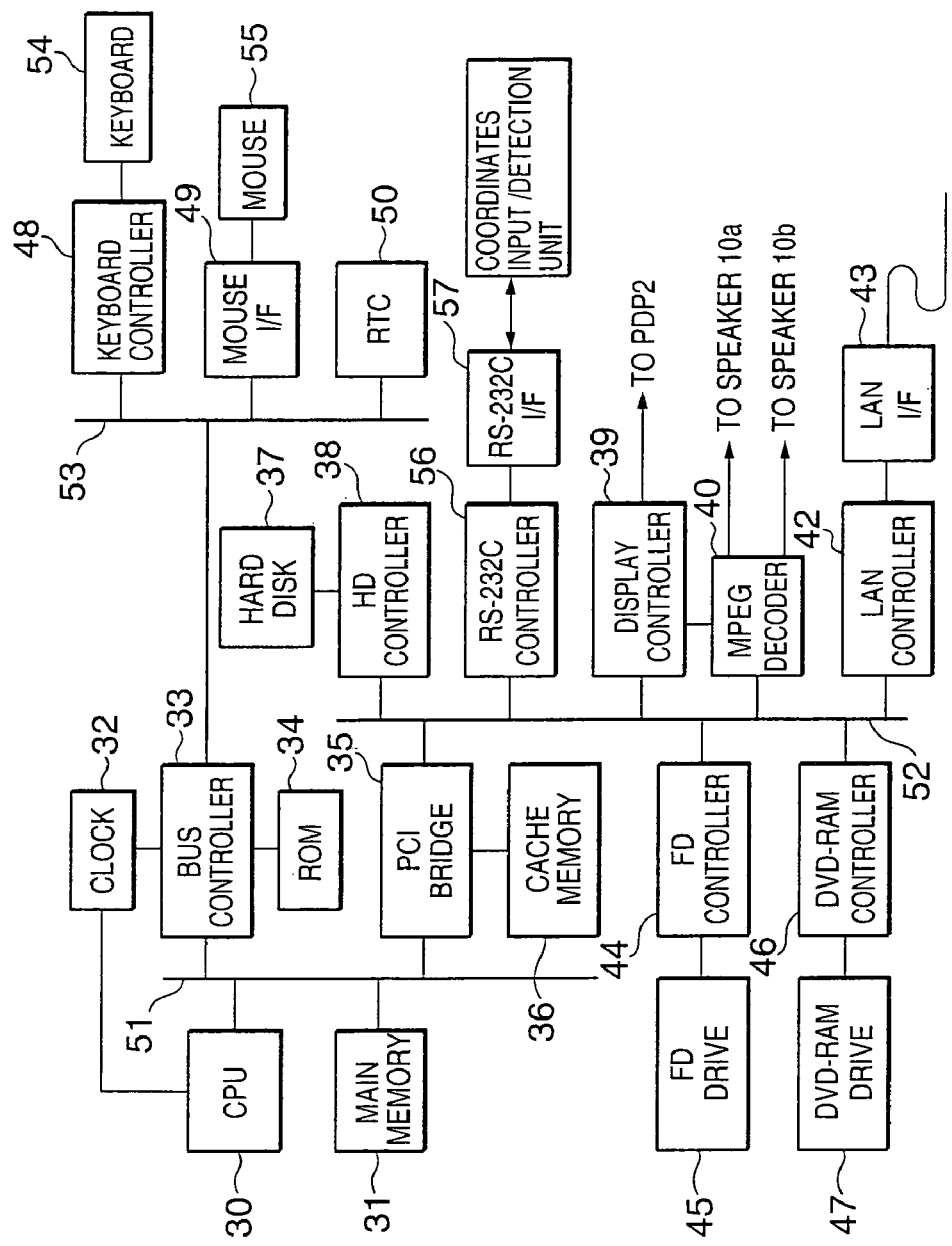
FIG. 7 is a diagram illustrating hardware components of the computer 5 that functions as a control unit according to the current invention.

Now referring to FIG. 7, a diagram illustrates hardware components of the computer 5 that functions as a control unit according to the current invention. The computer 5 includes a CPU 30, a main memory unit 31, a clock 32, a bus controller 33, a read only memory (ROM) unit 34, a peripheral component interconnect (PCI) bridge 35, a cache memory unit 36, a hard disk (HD) drive 37, a HD controller 38, a display controller 39, a moving picture experts group (MPEG) decoder 40, speakers 10a, 10b, a LAN controller 42, LAN interface (I/F) 43, a floppy disk (FD) controller 44, a FD drive 45, digital video or versatile disk random access memory (DVD-RAM) controller 46, a DVD-RAM drive 47, a keyboard controller 48, a mouse I/F 49, a real time clock (RTC)50, a RS-232 controller 56, a RS-232C I/F 57, a CPU bus 51, a PCI bus 52 and an internal or X bus 53.

Still referring to FIG. 1, the CPU 30 executes a control processing program stored in the ROM 34 and the operating system program and various application programs that are read into the main memory unit 31 from the hard disk 37. The main memory 31 further includes dynamic random access memory and is used as a work area for the CPU 30. The clock 32 further includes a crystal oscillator element and a frequency divider circuit and generates clock timing signals for controlling the operational timing of the CPU 30 and the bus controller 33. The bus controller 33 controls data transmission between the CPU bus 51 and the X bus 53. The ROM 34 stores a program that controls various devices and the system start up when power is turned on. The PCI bridge 35 uses the cache memory 36 and transfers data between the PCI bus 52 and the CPU 30. The cache memory 36 further includes DRAMs and is used by the PCI bridge 35. The hard disk 37 stores system software, various application programs and a plurality of user data. The HD controller 38 has an interface such as integrated device electronics with the hard disk 37 and transfers data at a high-speed transmission rate. The display controller 39 converts digital characters and graphics to the analog data and controls the data for displaying on the PDP 2. The MPEG decoder 40 decodes data in MPEG files that are stored in DVD-RAM and the hard disk 37 and outputs the decoded YUV (Y:U:V=4:2:2) video data to the display controller 39. Y represents intensity components while U and V represent chroma. U is equal to the difference between a primary color blue (B) and Y. Similarly, V is equal to the difference between the primary color (R) and Y. The decoded audio data is also converted from a digital format to an analog format and is outputted to the speakers 10a and 10b.

For example, the LAN controller 42 controls communication with other devices that are connected to the Ethernet via the LAN I/F 43 based upon the Institute of Electrical and Electronics Engineers (IEEE) 802.3 standard protocol. The FD controller 44 transfers data to and from the FD drive 45. For example, the DVD-RAM controller 46 has small computer system interface-2 (SCSI-2) and transfers data to and from the DVD-RAM drive 47. The keyboard controller 48 converts the serial data inputted from the keyboard 54 into parallel data. The mouse I/F 49 has a port for the mouse 55 and is controlled by a mouse driver or a control program. The RTC 50 is a date clock and is baked up a battery that is not shown in FIG. 7. The RS-232C controller 56 transfers data according to the RS-232C standard and inputs via the RS-232C I/F 57 coordinate data outputted from the coordinate input detection unit 3. Furthermore, in order for the coordinate input detection unit 3 to function as an input device for the computer 5, the keyboard 54 and the mouse 55 are not connected except when maintenance work is performed.

Eighty of the phototransistors 14 are equidistantly placed on the top portion of the coordinate input detection unit 3, and eighty of the LEDs 13 are also equidistantly placed on the bottom portion of the coordinate input detection unit 3. Similarly, sixty of the phototransistors 14 are equidistantly placed on the right portion of the coordinate input detection unit 3, and sixty of the LEDs 13 are also equidistantly placed on the left portion of the coordinate input detection unit 3. As described with respect to FIG. 4, the phototransistors 14 on the top portion are located at positions PV1 through PV80 from left to right. The LEDs 13 at the bottom portion are similarly located at positions LV1 through LV80 from left to right. The phototransistors 14 on the left portion are located at positions PH1 through PH60 from left to right. The LEDs 13 at the right portion are similarly located at positions LH1 through LH60 from left to right. Initially, the LEDs 13 at positions LV1 through LV80 are each sequentially turned on after a predetermined interval. That is, by time division, if an equal period of time is t1 through tn, the LED 13 at the position LV1 is turned on at t1 and the LED 13 at the positions LV1 is turned off at t2 while the LED 13 at a position LV2 is now turned on at t2. Similarly, the LED 13 at the position LV2 is turned off at t3 while the LED 13 at a position LV3 is now turned on at t3. While one of the LEDs 13 is being turned on, it is determined whether or not a corresponding predetermined number of the phototransistors 14 that is located across the one of the LEDs 13 detect infrared light. That is, for the single turned-on LED 13, the light detection is determined at a predetermined number of the phototransistors 14 that are located within an area where light from the above LED 13 reaches. The above detection ultimately determines whether or not the light path has been interrupted.

Figures 8, 9:
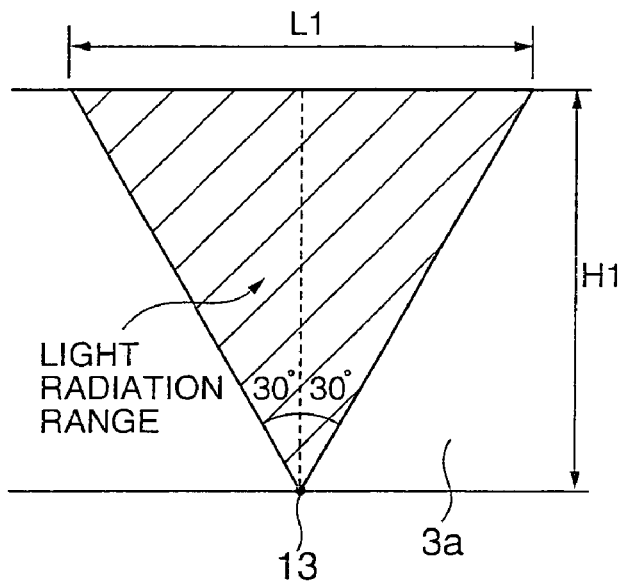
FIG. 8 is a diagram illustrating one exemplary of a detection range of the light emitted from a single LED.
FIG. 9 is an exemplary table for mapping the phototransistors that detect light from each of the LEDs that are horizontally positioned.

Now referring to FIG. 8, one exemplary detection arrangement is illustrated. The LED 13 has a light projection angle of ±60°. The vertical distance H1 between the LED 13 and the corresponding phototransistor 14 is 616 mm, and the horizontal distance L1 between the two adjacent LEDs 13 or the two adjacent phototransistors 14 is 10 mm. When there is no interruption by a pointer device near a screen surface on the display screen 2a, seventy-one of the phototransistors 14 detect the light emitted from a corresponding one of the LED 13 within an area length L1 of 711 mm. In other words, at least seventy-one light detection pathways radiate from the LED 13 and are marked by the hatched lines. Similarly, thirty-six of the phototransistors 14 detect the light emitted from a corresponding one of the positions LV1 through LV80 for the LED 13 on the side when there is no interruption by a pointer device near a screen surface on the display screen 2a.

Depending upon the location of the source LED 13, the number of the light detecting phototransistors varies.

FIG. 9 is an exemplary table 58 for mapping the phototransistors 14 that detect light from each of the LEDs 13. The mapping table 58 is stored in the main memory in advance and has some overlapping phototransistors 14 that detect light from a plurality of the LEDs 13. For example, the light detecting element or phototransistor 14 at the position PV1 detects light whenever any one of the light-emitting elements or LEDs 13 at the positions LV1 through LV36 emits light. In other words, as described above, the light detection path is formed between the LED 13 and the corresponding phototransistor and is used to detect the presence of a pointer device in the light detection path. Since a plurality of the phototransistors 14 are responding to each one of the LEDs 13, the light detection path is formed at a certain predetermined angle from the LED 13 towards the phototransistors 14. Furthermore, since each of the phototransistors 14 detects the LEDs that are activated by time division or sequentially activated, each of the phototransistors and one of the LEDs 13 form a radiating light detection path at any given time. Thus, every area of the two dimensional coordinate input detection area 3a is covered by the light detection paths in every direction. According to the mapping table 58, the phototransistors at the positions PV1 through PV36 detect light from the LED 13 at the position LV1, and as the active LED 13 shifts to the right by one, a group of the phototransistors 14 increases by one until the maximal number of the phototransistors 14 at the positions PV1 through PV71 all detects the active LED 13 at the position LV36. Then, as the active LED at the position LV36 sequentially shifts towards the LED 13 at the position LV45, the number of the light-detecting phototransistors 14 remains. Lastly, as the active LED 13 at the position LV46 further sequentially shifts towards the LED 13 at the position LV80, the number of the light-detecting phototransistors 14 decreases by one.

The CPU 21 sets in a register A one control word for bit setting or resetting a port PC in the PPI 26 and outputs the control word at the corresponding control word address (E3H) in order to activate the LED 13. Furthermore, the CPU 21 reads an input port address (E0H) of the PPI 26 into the register A in order to determine which input ports PA0 through PA7 are at the H level. The H level indicates the detection of the light by the corresponding phototransistor 14. The coordinate input detection unit 3 detects that a pen or a finger has contacted the display surface 2a of the PDP 2 by using the phototransistors and the LEDs 13.

Figure 14:
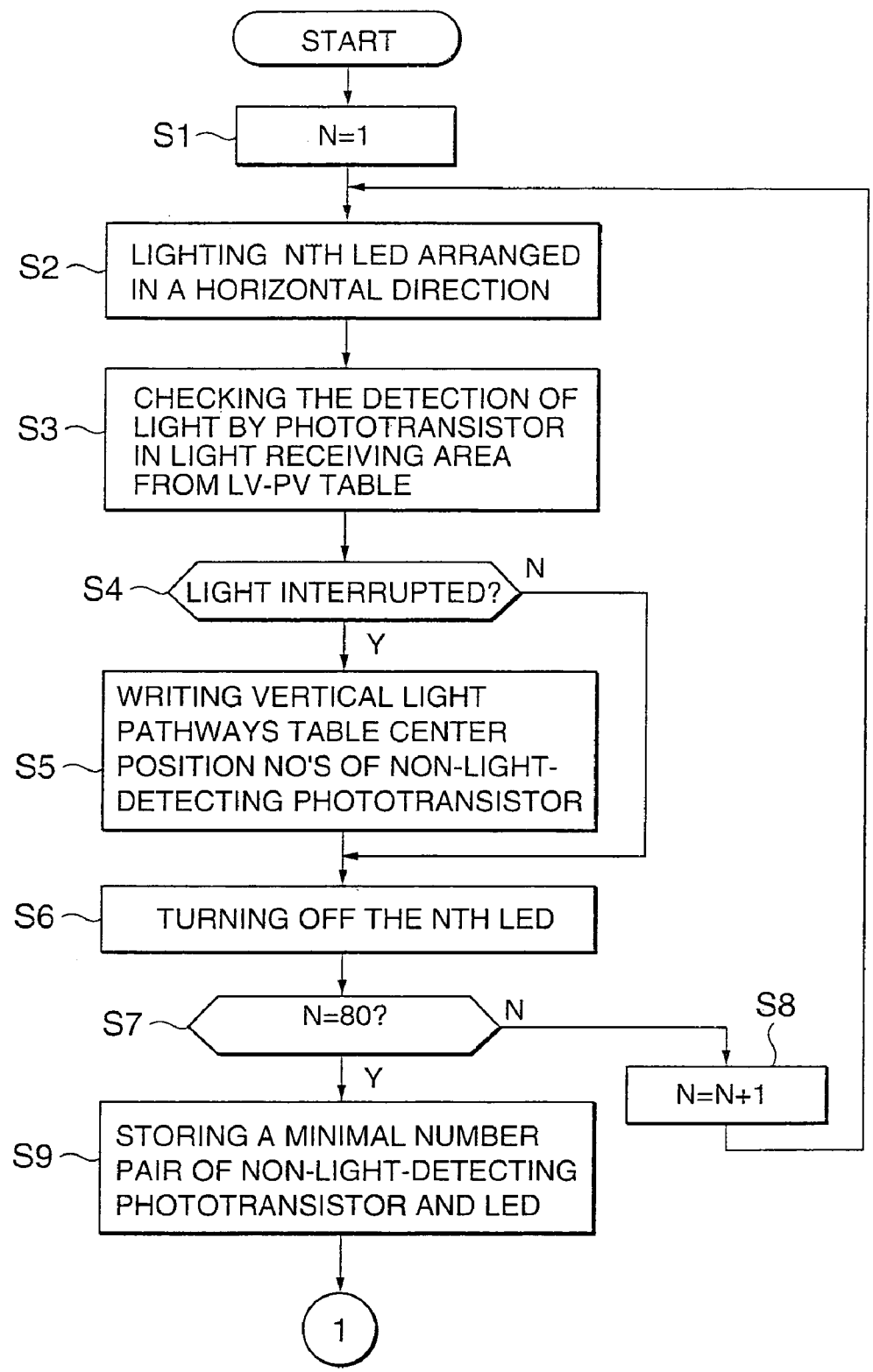
FIG. 14 is a flow chart illustrating certain steps involved in a first preferred process of determining coordinates on the display surface according to the current invention.
Figure 15:
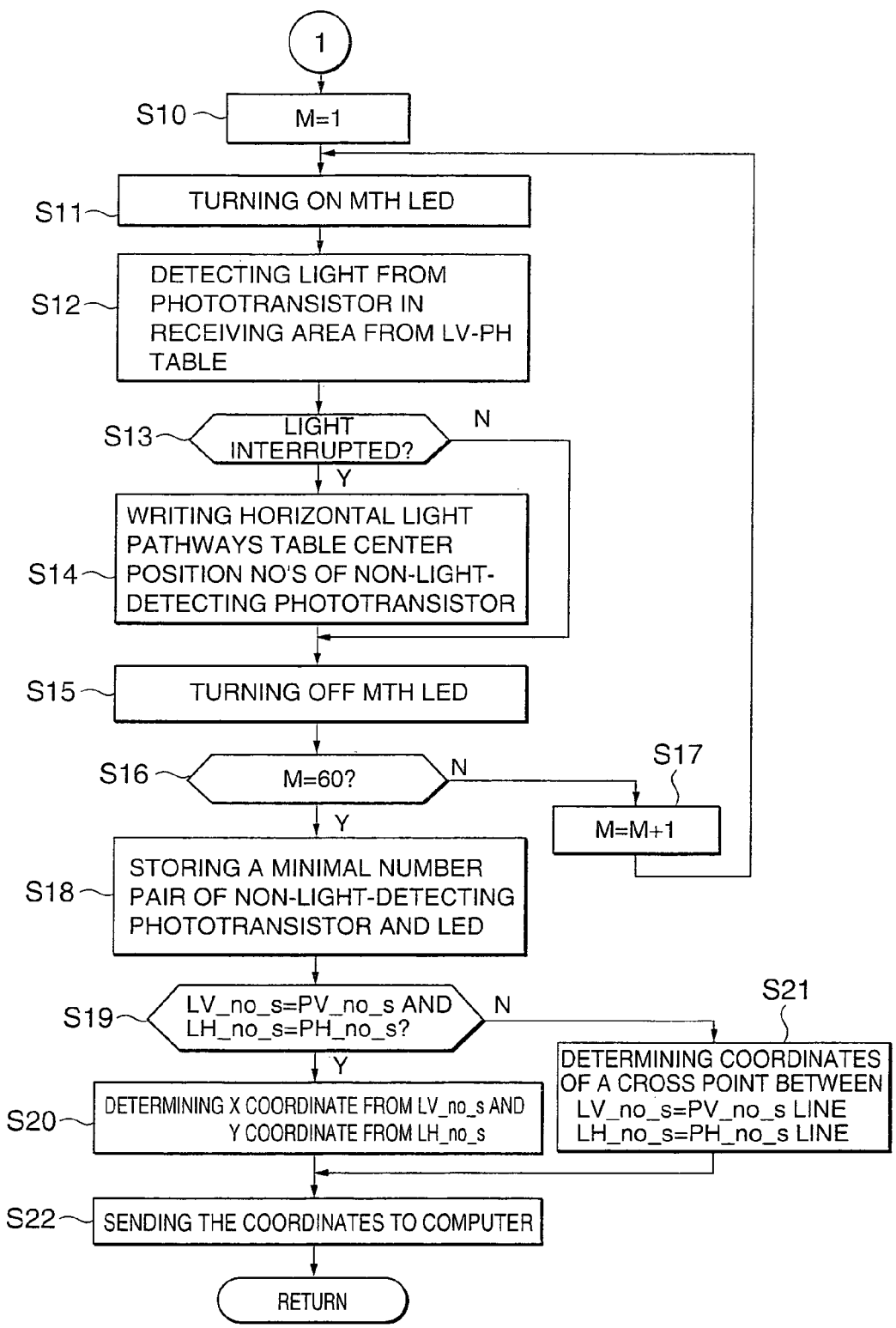
FIG. 15 is a flow chart illustrating other steps involved in the first preferred process of determining coordinates on the display surface according to the current invention.

Now referring to FIGS. 14 and 15, a flow chart illustrates steps involved in a preferred process of determining coordinates on the display surface according to the current invention. The steps will be described with respect to the above described preferred embodiments. After a counter N is initialized to 1 in a step S1, the CPU 21 sequentially activates one of the LEDs 13 at a time from the position LV1 to the position LV80 in a horizontal direction in a step S2. Based upon the comparison to the LV-PV mapping table 58, it is determined whether or not a group of corresponding phototransistors has detected light from a given one of the LEDs 13 in a step S3. That is, the CPU 21 initially selects one of the output terminals PC0 through PC7 and sets in a register A one control word for bit setting or resetting the selected port PC in the PPI 26. The CPU21 also outputs the control word at the corresponding control word address (E3H) in order to activate the LED 13. The above described step S2 implements the light-emitting control process or means. Based upon the comparison to the LV-PV mapping table 58, in a step 3, the CPU 21 checks the input ports PA0 through PA7 of the PPI 26 that is connected to the phototransistors 14 in the area for receiving the light from the active LED 13 and determines which input ports PA0 through PA7 are at the H level by reading an input port address (E0H) of the PPI 26 into the register A. Since a plurality of the PPIs 26 connected to the phototransistors 14 exists in an area for receiving light emitted from a single one of the LEDs 13, these PPIs 26 are sequentially checked. The above described step S3 implements the check process or means.

Still referring to FIG. 14, steps 4 through 8 will be described. It is determined in a step S4 whether or not a light path has been interrupted. If no light path has been interrupted, after a predetermined amount of time has passed following the onset of the current LED 13, the current or the Nth LED 13 is turned off in a step S6. If it is determined that the counter N is not yet 80 in a step S7, the counter N is incremented by one in a step S8 and an immediately adjacent or N+1 LED 13 is turned on in the step S2. Since there is a plurality of the PPIs 26, the above described steps S2 through S8 are repeated for each of the PPIs 26. On the other hand, if it is determined in the step S4 that a light path is interrupted, the PV numbers or PV_no's of the central position of the no-light-detecting phototransistors 14 are stored in the main memory unit 31 in a step S5. For example, the PV numbers of the central position of the no-light-detecting phototransistors 14 include 1, 1.5, 2, 2.5, 3 . . . 80. When there is an even number of the no-light-detecting phototransistors 14, the PV number of the central position of no-light-detecting phototransistors 14 is the average PV number of the two most centrally located no-light-detecting phototransistors 14. That is, for example, if the fifth (PV5) through eighth (PV8) phototransistors 14 fail to detect light, the central position number PV_no is 6.5. When there is only one no-light-detecting phototransistor 14, the corresponding PV number is stored in the main memory 31 as the central position. The above described step 5 is repeated for each of the LEDs 13 at the positions LV1 through LV80 for the vertical light pathways, and the results are stored in a vertical light pathways table in the main memory unit 31. One example of the vertical light pathways table 59 is illustrated in FIG. 10.

Step S9 is performed after all of the LEDs 13 at the positions LV1 through LV80 have been turned on and subsequently turned off. The step 7 determines whether or not all of the LEDs 13 have been sequentially turned on and off by comparing the counter N to the constant. When the counter N is 80, based upon the vertical light pathways table 59, the LED positions LV1 through LV80 and the corresponding central position PV_no of the no-light-detecting phototransistors 14 are examined so that a pair with the minimal difference between the two is selected in a step 9. The selected pair of the LED position and the central position PV_no is respectively denoted by (LV_no_s, PV_no_s) and is stored as a vertically interrupted light minimal number pair in the main memory unit 31 in the step S9. For example, using the exemplary values in the vertical light pathways table 59 of FIG. 10, the vertically interrupted light minimal number pair is LV_no_s=40, PV_no_s=40.

Now referring to FIG. 15, a flow chart illustrates the rest of the steps in the preferred process according to the current invention. After a counter M is initialized to 1 in a step S10, the CPU 21 sequentially activates one of the LEDs 13 at a time from the position LH1 to the position LH60 in a vertical direction in a step S11. Based upon the comparison to a LH-PH mapping table 60 as shown in FIG. 11, it is determined whether or not a group of corresponding phototransistors has detected light from a given one of the LEDs 13 in a step S12. Similarly to the LV-PV mapping table 58, the LH-PH mapping table 60 is stored in the main memory 31 in advance and has some overlapping phototransistors 14 that detect light from a plurality of the LEDs 13. For example, the light detecting element or phototransistor 14 at the position PH1 detects light whenever any one of the light-emitting elements or LEDs 13 at the positions LH1 through LH53 emits light. The light-emitting duration of the LEDs 13 at vertical positions LH1 through LH60 is the same as that of the LEDs 13 at horizontal positions LV1 through LV80 based upon a common timer. Alternatively, using another timer, the light-emitting duration of the LEDs 13 at vertical positions LH1 through LH60 is shorter that of the LEDs 13 at horizontal positions LV1 through LV80. The above described step S11 implements the light-emitting control process or means. The above described step S12 implements the check process or means.

Figures 12, 13:
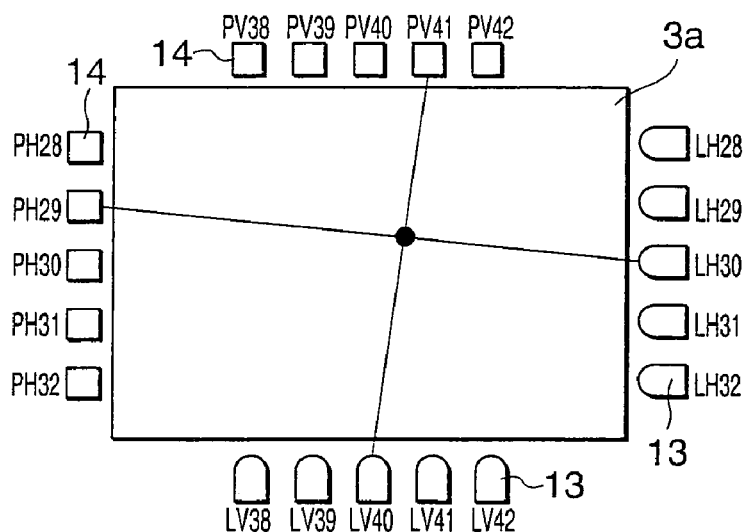
FIG. 12 is one example of the horizontal light pathways table.
FIG. 13 illustrates an example of the situation where the vertically interrupted light minimal number pair and the horizontally interrupted light minimal number pair both fail to have the same value.

Still referring to FIG. 15, steps 13 through S17 will be described. It is determined in a step S13 whether or not a light path has been interrupted. If no light path has been interrupted, after a predetermined amount of time has passed following the onset of the current LED 13, the current or the Mth LED 13 is turned off in a step S15. If it is determined that the counter M is not yet 60 in a step S16, the counter M is incremented by one in a step S17 and an immediately adjacent or M+1 LED 13 is turned on in the step S2. Since there is a plurality of the PPIs 26, the above described steps S13 through S17 are repeated for each of the PPIs 26. On the other hand, if it is determined in the step S13 that a light path is interrupted, the PH numbers or PH_no's of the central position of the no-light-detecting phototransistors 14 are stored in the main memory unit 31 in a step S14. For example, the PH numbers of the central position of the no-light-detecting phototransistors 14 include 1, 1.5, 2, 2.5, 3 . . . 80. When there is an even number of the no-light-detecting phototransistors 14, the PH number of the central position of no-light-detecting phototransistors 14 is the average PH number of the two most centrally located no-light-detecting phototransistors 14. That is, for example, if the fifth (PH5) through eighth (PH8) phototransistors 14 fail to detect light, the central position number PH_no is 6.5. When there is only one no-light-detecting phototransistor 14, the corresponding PH number is stored in the main memory 31 as the central position. The above described step 14 is repeated for each of the LEDs 13 at the positions LH1 through LH60 for the horizontal light pathways, and the results are stored in a horizontal light pathways table in the main memory unit 31. One example of the horizontal light pathways table 61 is illustrated in FIG. 12.

Step S18 is performed after all of the LEDs 13 at the positions LH1 through LH60 have been turned on and subsequently turned off. The step 16 determines whether or not all of the LEDs 13 have been sequentially turned on and off by comparing the counter M to the constant. When the counter M is 60, based upon the horizontal light pathways table 61, the LED positions LH1 through LH60 and the corresponding central position PH_no of the no-light-detecting phototransistors 14 are examined so that a pair with the minimal difference between the two is selected in a step 18. The selected pair of the LED position and the central position PH_no is respectively denoted by (LH_no_s, PH_no_s) and is stored as a horizontally interrupted light minimal number pair in the main memory unit 31 in the step S18. For example, using the exemplary values in the horizontal light pathways table 61 of FIG. 12, the horizontally interrupted light minimal number pair is LH_no_s=30, PH_no_s=30.

After the above described vertically and horizontally interrupted light minimal number pairs are determined in the steps 1 through 18, the vertically and horizontally interrupted light minimal number pairs are compared in a step 19. If it is determined that the vertically interrupted light minimal number pair, LV_no_s, PV_no_s and the horizontally interrupted light minimal number pair, LH_no_s, PH_no_s have the same value in the step 19, the X coordinate is determined to be the X distance between the origin and the interrupted light position and the Y coordinate is determined to be the Y distance between the origin and the interrupted light position in the step 20. The X and Y distances between the coordinate origin such as the upper left corner of the display screen 2a of the PDP 2 and the LEDs 13 or the phototransistors 14 are known in advance since the coordinate input detection unit 3 is fixedly placed on the PDP 2. For this reason, the above known X and Y distance values are optionally stored in the ROM 34. Based upon these stored values, the contact coordinates of the interrupted light point are determined on the display screen 2a of the PDP 2.

On the other hand, if it is determined that the vertically interrupted light minimal number pair, LV_no_s, PV_no_s or the horizontally interrupted light minimal number pair, LH_no_s, PH_no_s fails to have the same value in the step 19, the contact coordinates of the interrupted light point on the display screen 2a of the PDP 2 is determined by the use of additional lines in a step S21. In the step 21, a first line is determined by connecting the positions corresponding to LV_no_s and PV_no_s while a second line is determined by connecting the positions corresponding to LH_no_s and PH_no_s. The coordinates of a crossing point of the first and second lines are used for determining the above described X and Y coordinates in the step S21. The above described steps S5, S9, S14, S18 through S21 implement the determination or calculation process or means. Finally, the CPU21 transmits the above obtained contact coordinates to the computer 5 via the serial data LSI 125 in a step S22. The computer 5 generates image data when the received contact coordinate values are within the predetermined image rendering area and displays the image on the display screen surface 2a of the PDP 2. On the other hand, if the received contact coordinate values are within the predetermined menu area, a selected menu action is performed.

One exemplary way to determine the coordinates of the cross point of the first and second lines is illustrated below.

Assuming that the first line between LV_no_s and PV_no_s is expressed by the following equation:

$$y = ax + b \quad (1)$$

Let the coordinates of the positions LV_no_s and PV_no_s respectively be (X_LV_s, Y_LV_no_s) and (X_PV_no_s, Y_PV_no_s), by substituting these coordinates into the above equation (1), a second equation (2) is obtained.

$$Y\_LV\_no\_s = a(X\_LV\_no\_s) + b \quad (2)$$

$$Y\_PV\_no\_s = a(X\_PV\_no\_s) + b \quad (3)$$

From the above equations (2) and (3), the constants a and b are determined. Further assuming that the second line between LH_no_s and PH_no_s is expressed by the following equation:

$$y = cx + d \quad (4)$$

By the above described substitutions, the constants c and d are similarly determined by substituting the coordinates of LH_no_s and PH_no_s into the above equation (4). The values of the above constants a, b, c and d are substituted back respectively into the equations (1) and (4) so that the coordinates of the cross point of the first and second lines are determined.

FIG. 13 illustrates an example of the situation where the vertically interrupted light minimal number pair, LV_no_s, PV_no_s and the horizontally interrupted light minimal number pair, LH_no_s, PH_no_s both fail to have the same value in the step 19. Although it is ssumed that LV_no_s=40, PV_no_s=41, LH_no_s=30 and PH_no_s=29 in this example, the diagram itself does not necessarily reflect the above coordinate in a proportionally accurate manner.

In summary, in the preferred embodiments according to the current invention, each of the LEDs 13 emits light in a predetermined area, and a plurality of the phototransistors 14 detects the light in an overlapping manner. By sequentially activating each of the LEDs 13, the width of a light detection path is narrower than the physical distance between the two adjacent LEDs 13 or the two adjacent phototransistors 14 in either direction of the light. The two dimensional area of the coordinate input detection area 3a is all covered by the light detection pathways. Over the coordinate input detection area 3a, the coordinates are determined at a high resolution level based upon the positional relationship between one of the LEDs 13 and the light-interrupted phototransistor 14. Furthermore, the coordinates are determined at a high resolution level based upon the positional relationship of two pairs of the LED 13 and the light-interrupted phototransistor 14. In the preferred embodiment according to the current invention, the coordinates are determined to be the closest to an actual cross point since it is based upon the cross point of two minimal distance pairs of the LED 13 and the light-interrupted phototransistor 14 for light emitting-detecting element groups 15V and 15H as shown in FIG. 4.

In the preferred embodiment, a timer is used to have the same amount of time for activating each of the LEDs 13 and for determining each of the coordinates. In an alternative embodiment, no timer is used, and a new of the LEDs 13 is activated after all PPIs 26 connected to the phototransistors 14 in the light receiving area of the currently active one of the LEDs 13 are checked. The above described advantageous features and functions are performed by executing via the CPU 30 a software program that is stored in a memory such as FD and DVD-RAM. For example, referring to FIG. 7, in the preferred embodiment, information storage media for storing software include ROM 34, FD and DVD-RAM, and the CPU 30 performs various functions such as a light emitting-detecting control means, a check means and a determination means. In one preferred embodiment, the software is installed in the ROM 34, and the CPU 30 reads it into the main memory 31 at the CPU start-up time. By executing certain software programs by the CPU 30, the above described coordinate input detection process is implemented. In an alternative embodiment, the memory storage unit further includes any temporary memory area containing a program that is downloaded from LAN and the Internet.

Figure 16:
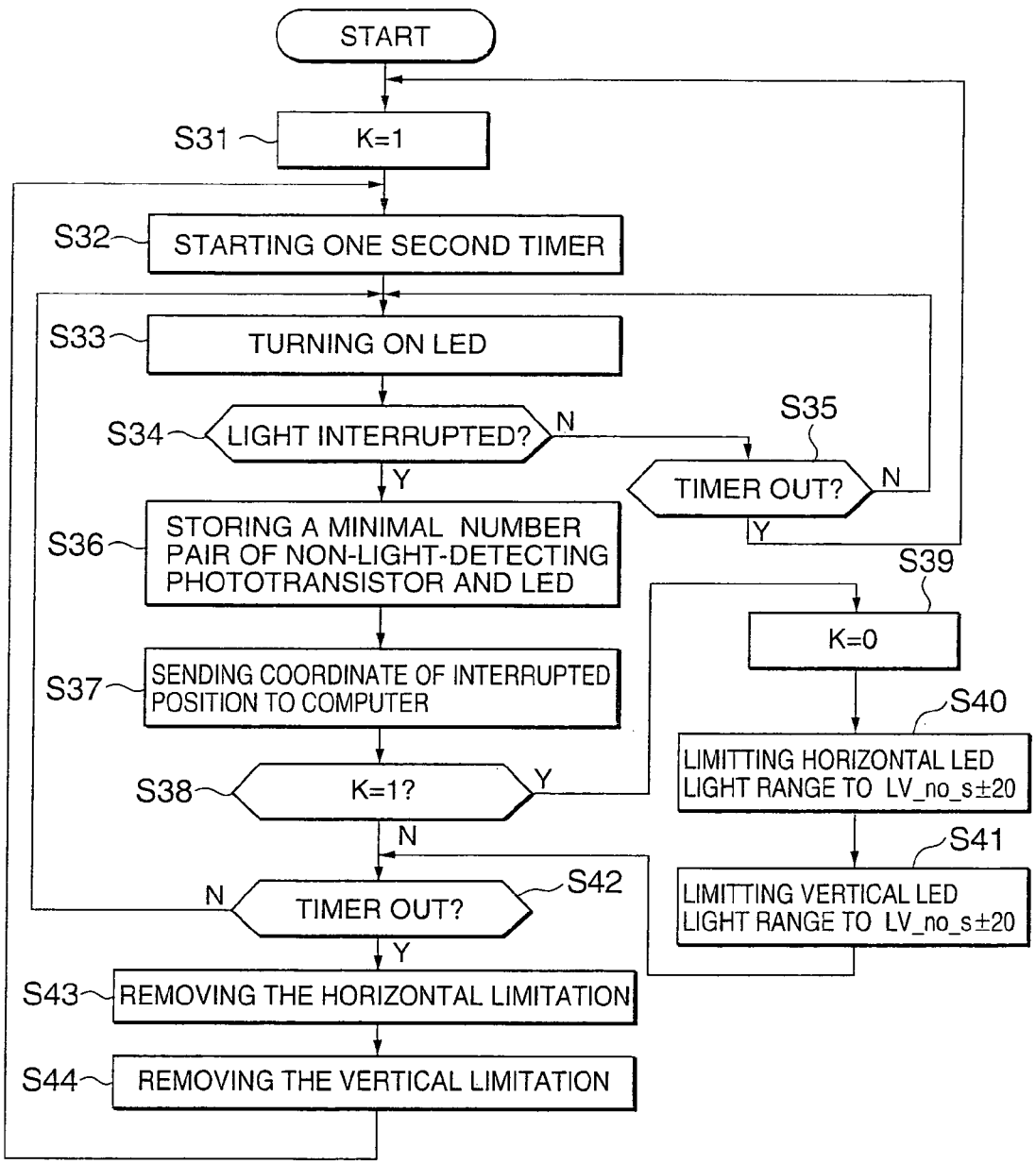
FIG. 16 is a flow chart illustrating steps involved in a second preferred process of the coordinate input-detection according to the current invention.

Now referring to FIG. 16, a flow chart illustrates steps involved in a second preferred process of the coordinate input-detection according to the current invention. To illustrate the second preferred process, various components or units are referred with respect to previous figures. In general, when characters are hand-written on a large screen such as the 42-inch PDP2, the sampling interval of 20 milliseconds is sufficient for determining the inputted coordinates. In this case, the coordinates are determined fifty times each second. During the one second interval, the distance that is traveled by a pen or a finger is relative small in comparison to the screen size. In the second preferred embodiment, the range of the active LEDs 13 is restricted to certain adjacent ones of the currently active LED 13 after the light from the currently active LED 13 is found interrupted. The above limitation allows that the coordinates are determined only within an area whose center is the position of the light interruption.

Still referring to FIG. 16, after a counter K is initialized to 1 in a step S31, a one-second timer is started in a step S32. The CPU 21 sequentially activates one of the LEDs 13 at a time in a step S33. Based upon the comparison to the LV-PV mapping table 58, it is determined whether or not a group of corresponding phototransistors has detected light from a given one of the LEDs 13 in a step S34. If there is no light interruption in the step S34, the above steps S33 and S34 are repeated until the timer runs out in a step S35. On the other hand, if it is determined that light interruption has occurred in the step S34, the PH numbers or PH_no's of the central position of the no-light-detecting phototransistors 14 are stored in the main memory unit 31 in a step S36. Similarly, the PV numbers or PV_no's of the central position of the no-light-detecting phototransistors 14 are also stored in the main memory unit 31 in the step S36. Furthermore, as described with respect to the steps S19 through S21 in the first preferred process, the coordinates of the interrupted light are determined also in the step S36. The obtained light interrupted coordinates are sent to the computer 5 in a step S37. It is subsequently determined whether or not the counter K is equal to one in a step S38. If it is determined that the counter K is indeed one, the counter value is initialized to be zero in a step S39 in order to restrict the range of the active LEDs 13. The light-emitting range of the LEDs 13 is limited to be LV_no_s±20 in the horizontal direction in a step S40. Similarly, the light-emitting range of the LEDs 13 is limited to be LH_no_s±20 in the vertical direction in a step S41. Until the timer runs out in a step S42, the above described steps S33 through S37 are repeated to detect the light interruption and to determine the coordinates within the restricted area. When the predetermined time runs out as determined in the step S42, the horizontal active limitation for the LEDs 13 is removed in a step S43. Similarly, the vertical active limitation for the LEDs 13 is subseqntly removed in a step S44. The second preferred process resumes to the step S32 to start the one-second timer again.

Assuming that the coordinates upon detecting the light interruption indicate the central point of the display screen surface 2a of the PDP2, the vertically interrupted light minimal number pair has LV_no_s=40 and PV_no_s=40 while the horizontally interrupted light minimal number pair has LH_no_s=30 and PH_no=30. In the above example, the LEDs 13 are sequentially activated at the positions LV20 through LV60 in the horizontal direction and at the positions LH10 through LH50 in the vertical direction during one second after the detection of the light interruption. As also described with respect to the first preferred embodiment, the coordinates of the light interruption position are determined and are sent to the computer 5 via the serial data LSI 125. Until no light interruption is detected, the emitting range of the LEDs 13 is updated every single second. Only approximately 20 LEDs are serially activated from the light interrupted position in the horizontal and vertical directions. The second timer uses an interrupt from the timer 24. In summary, the second preferred embodiment relies upon the fact that the input coordinates do not significantly vary after a short period of time and remain within a relatively narrow range. By taking advantage of the above fact, the second preferred embodiment limits the activation of the LEDs 13 within a predetermined range so that the coordinates are detected only near the initially inputted coordinates. The LEDs 13 are not wastefully activated.

Figure 17:
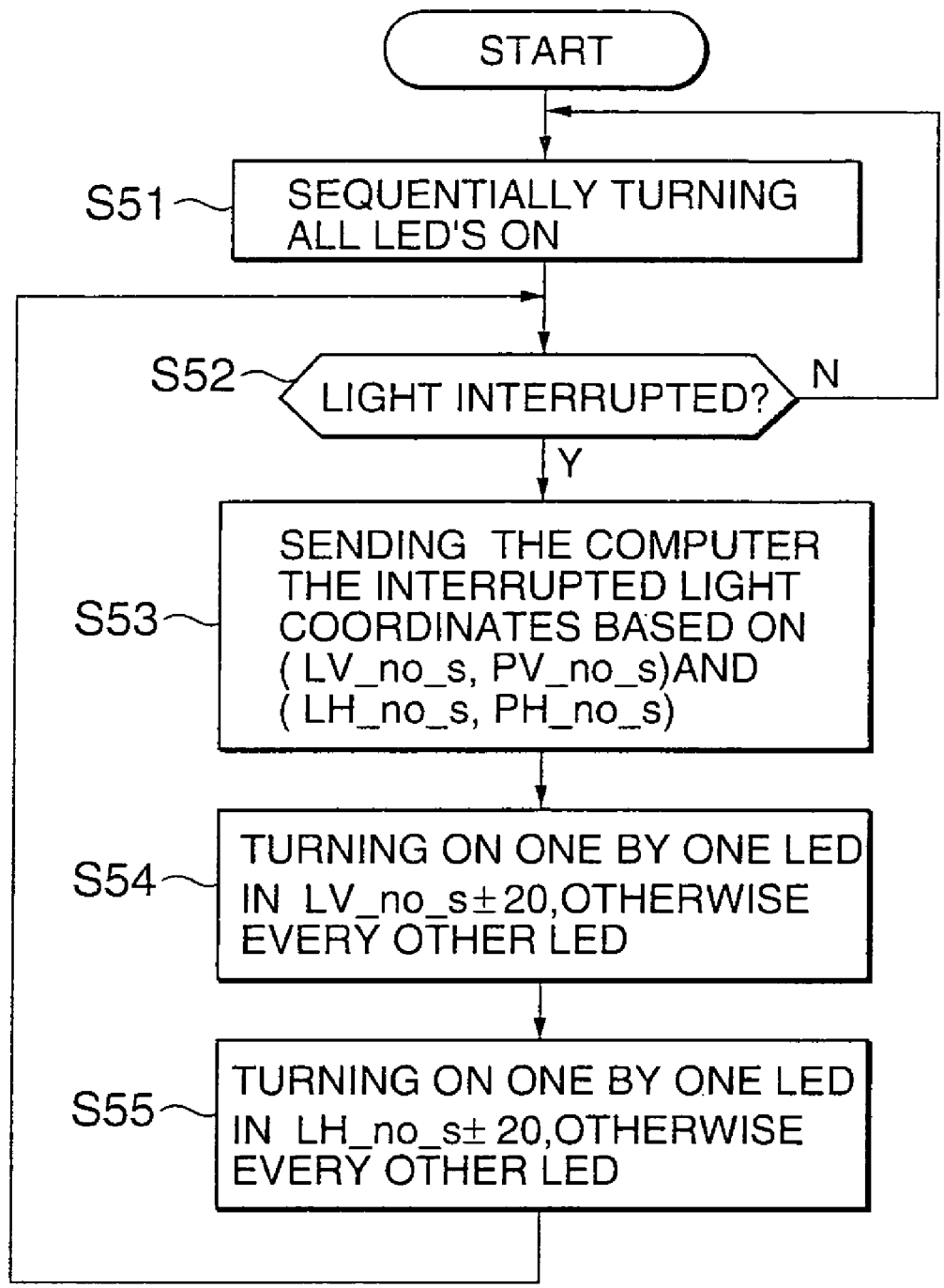
FIG. 17 is a flow chart illustrating steps involved in a third preferred process of the coordinate input-detection according to the current invention.

Now referring to FIG. 17, a flow chart illustrates steps involved in a third preferred process of the coordinate input-detection according to the current invention. When the handwritten input such as characters takes place at two different locations on a large screen display such as a 42-inch PDP 2, it is necessary to detect the light interruption all over the coordinate input detection area 3a. In the third preferred embodiment, in general, the LEDs 13 are activated within a first predetermined limited area from a interrupted light position in order to determine the coordinates of the light interrupted position. Within the first predetermined limited area, every one of the LEDs 13 is sequentially activated. On the other hand, outside the first predetermined limited area, only every other one of a predetermined number of the LEDs 13 is sequentially activated. When the light interruption is detected in the outside the first predetermined limited area and the coordinate of the light interruption is determined, every one of the LEDs 13 is sequentially activated within a second predetermined limited area from the detected interrupted light position in the first predetermined limited area.

Still referring to FIG. 17, more specifically, in a step S51, one of the LEDs 13 is sequentially activated, and in a step S52, it is determined whether or not corresponding ones of the phototransistors 14 detect the light interruption. When there is no detection of the light interruption in the step S52, the third preferred process proceeds back to the step S51 to activate another one of the LEDs 13. In contrast, when there is any detection of the light interruption in the step S52, both the vertically interrupted light minimal number pair, LV_no_s and PV_no_s and the horizontally interrupted light minimal number pair, LH_no_s and PH_no are determined in a step S53. Based upon the two pairs of the values, LV_no_s and PV_no as well as LH_no_s and PH_no, the coordinates of the light interruption position are also determined and then sent to the computer 5 in the step S53. After the coordinates of the light interruption position have been determined, every one of the LEDs 13 within ±20 of the vertically interrupted light minimal number, LV_no_s is sequentially activated in a step S54. Also in the step S54, only every other one of the LEDs 13 outside ±20 of the vertically interrupted light minimal number, LV_no_s is sequentially activated. Similarly, every one of the LEDs 13 within ±20 of the horizontally interrupted light minimal number, LH_no_s is sequentially activated in a step S55. Also in the step S55, only every other one of the LEDs 13 outside ±20 of the vertically interrupted light minimal number, LH_no_s is sequentially activated. The above described flow chart is relatively simplified and excludes other steps for monitoring an amount of time such as to one second to limit an area for activating the LEDs 13 by switching the area.

The following two examples are illustrated. For example, upon detecting the light interruption if the vertically interrupted light minimal number pair has LV_no=20 and PV_no_s=20 while the horizontally interrupted light minimal number pair has LH_no_s=20 and PH_no=20, for one second after the light interruption detection, every one of the LEDs 13 in the coordinate input detection unit 3 is each sequentially activated at the positions LV1 through LV40 and the positions LH1 through LH40. At any other positions, only every other one of the LEDs 13 is sequentially activated. Finally, the coordinates of the light interruption are determined and sent to the computer 5 via the serial data transmission LSI 25. For another example, upon detecting the light interruption if the vertically interrupted light minimal number pair has LV_no_s=70 and PV_no_s=70 while the horizontally interrupted light minimal number pair has LH_no_s=30 and PH_no=30, for one second after the light interruption detection, every one of the LEDs 13 in the coordinate input detection unit 3 is each sequentially activated at the positions LV1 through LV40 and LV51 through LV80 as well as the positions LH1 through LH50 which is the result of the logical AND between LH1 through LH40 and LH11 through LH50. At any other positions, only every other one of the LEDs 13 is sequentially activated. Finally, the coordinates of the light interruption are determined and sent to the computer 5 via the serial data transmission LSI 25. After every second, the LED activation area is updated.

Figure 18:
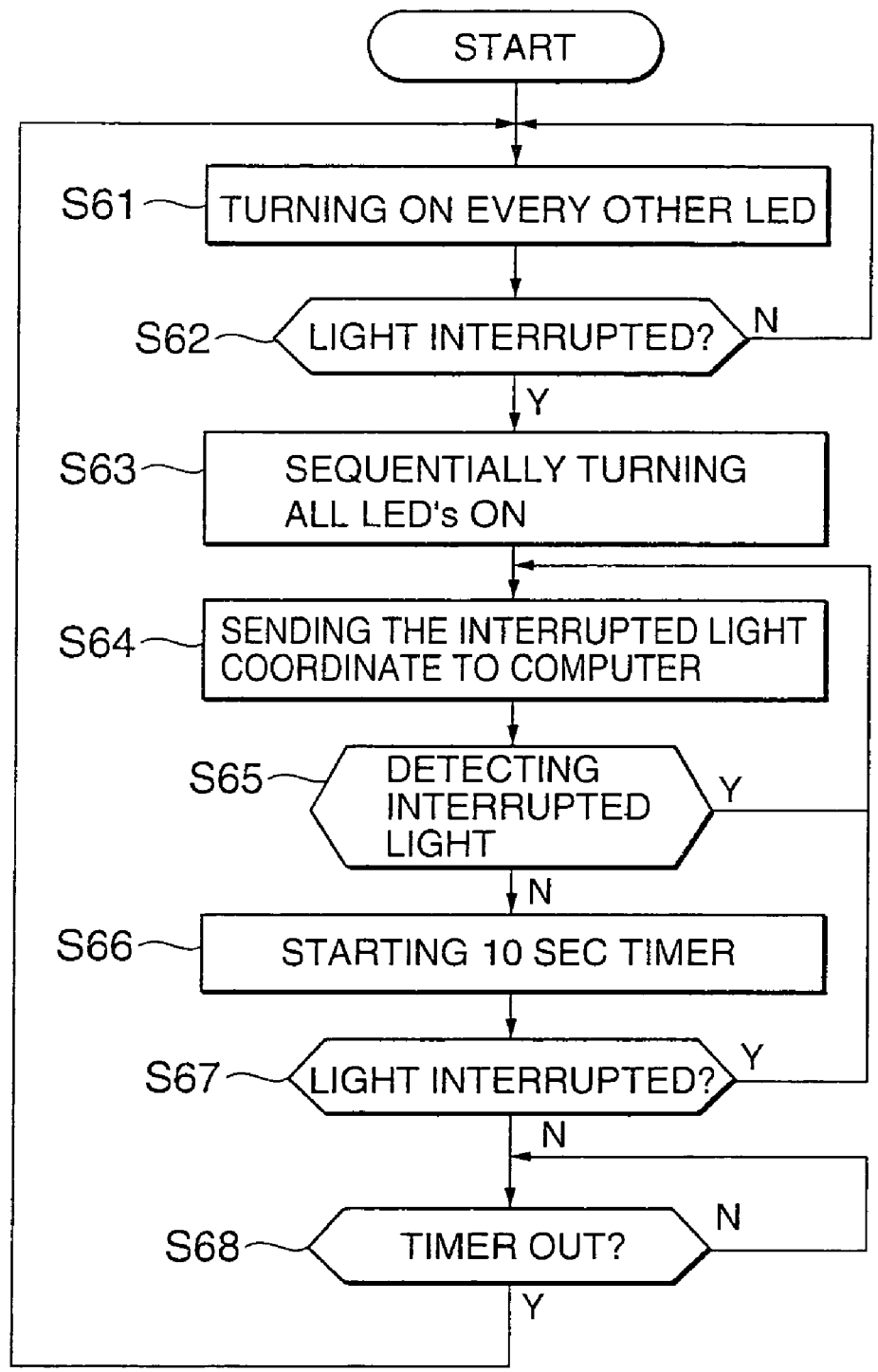
FIG. 18 is a flow chart illustrating steps involved in a fourth preferred process of the coordinate input-detection according to the current invention.

Now referring to FIG. 18, a flow chart illustrates steps involved in a fourth preferred process of the coordinate input-detection according to the current invention. When the handwritten input such as characters takes place at two different locations on a large screen display such as a 42-inch PDP 2, it is necessary to detect the light interruption all over the coordinate input detection area 3a. In the fourth preferred embodiment, the LEDs 13 are activated in two predetermined activation modes. In a first predetermined LED activation mode, every one of the LEDs 13 is sequentially activated when there are continuous coordinate inputs. In a second predetermined LED activation mode, only every one of a predetermined number of the LEDs 13 is sequentially activated when there is no continuous coordinate input for a predetermined amount of time.

Still referring to FIG. 18, more specifically, in a step S61, every predetermined number such as every other one of the LEDs 13 is sequentially activated in the second predetermined LED activation mode, and in a step S62, it is determined whether or not corresponding ones of the phototransistors 14 detect the light interruption. When there is no detection of the light interruption in the step S62, the fourth preferred process proceeds back to the step S61 to activate every other one of the LEDs 13. In contrast, when there is any detection of the light interruption, every one of the LEDs 13 is sequentially activated in a step S63. Based upon the two pairs of the values, LV_no_s and PV_no as well as LH_no_s and PH_no, the coordinates of the light interruption position are determined and then sent to the computer 5 in a step S64 as described with respect to the step S53 of the third preferred embodiment. In a subsequent step S65, it is determined whether or not next light interruption is found. If a next light interruption is found, the fourth preferred process repeats the above described step S64. On the other hand, if no light interruption is found in the step S65, the fourth preferred process starts a timer in a step S66 and resumes another detection step S67. If light interruption is detected, the fourth process proceeds back to the step S64 to determine the input coordinates or the coordinates of the light interruption position in the step S64. On the other hand, if no light interruption is found in the step S67, the timer initiated in the step S66 is determine a predetermined amount such as ten seconds has passed without any detection of light interruption after the step S65. One implementation of the timer out determination step S68 is to use an interrupt signal from the timer 24. Upon detecting the time out in the step S68, the fourth preferred process resumes to the step S61 to start second predetermined LED activation mode. If no time out is achieved, the fourth preferred embodiment waits till the clock times out in the step S68 to resume to the step S61.

In summary, the fourth preferred embodiment has the above described two LED activation modes for the input coordinate determination. Only when there is a coordinate input, every one of the LEDs 13 is activated in the all LED sequential activation mode or the first predetermined activation mode. When there is no coordinate input, the LED activation mode is switched to the less-than-all LED sequential activation mode or the second predetermined activation mode. The above mode switch enables to reduce the power consumption while maintaining the high resolution in determining the input coordinates.

Figure 19:
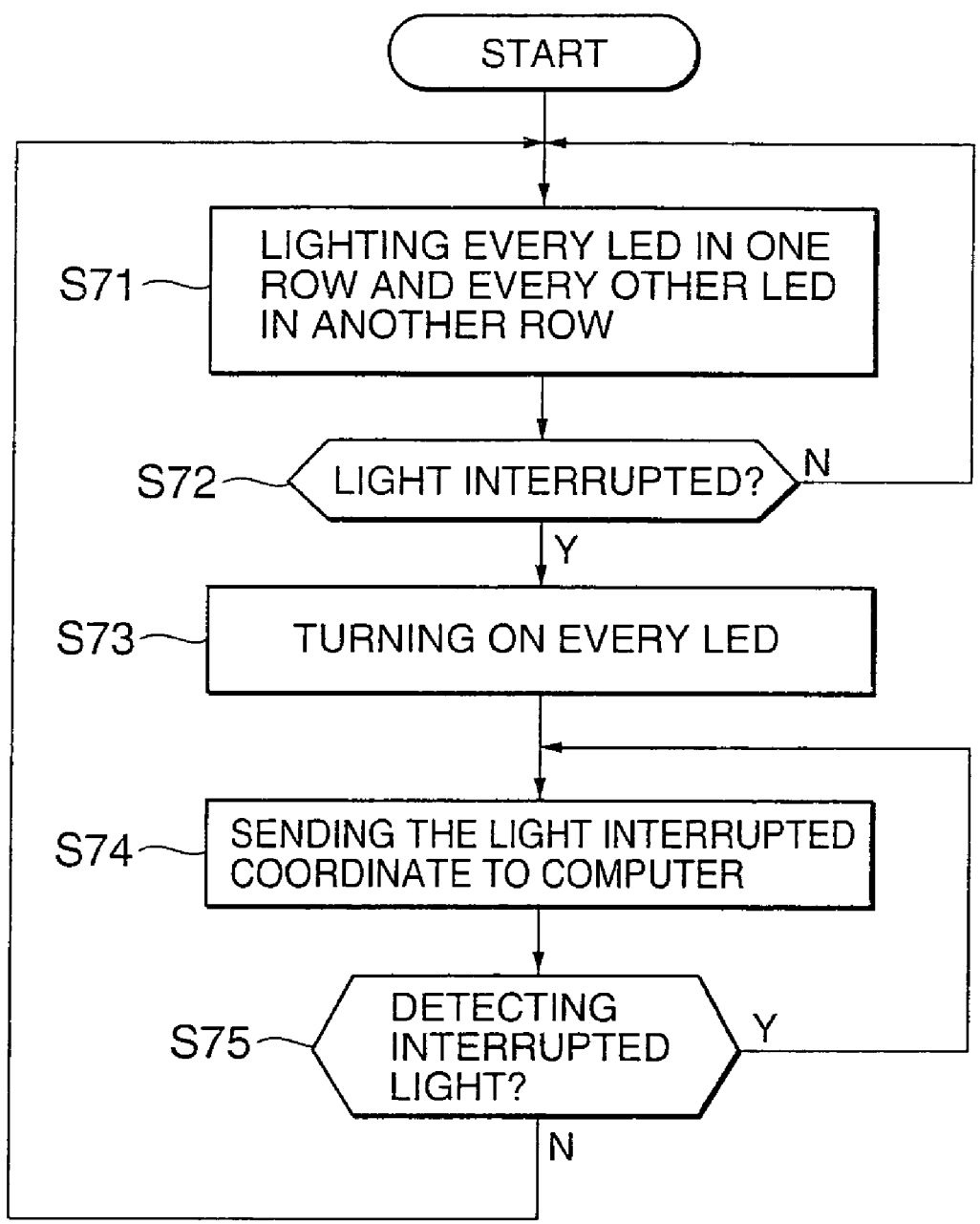
FIG. 19 is a flow chart illustrating steps involved in a fifth preferred process of the coordinate input-detection according to the current invention.

Now referring to FIG. 19, a flow chart illustrates steps involved in a fifth preferred process of the coordinate input-detection according to the current invention. When the handwritten input such as characters takes place at two different locations on a large screen display such as a 42-inch PDP 2, it is necessary to detect the light interruption all over the coordinate input detection area 3a. In the fifth preferred embodiment, the LEDs 13 are activated in two predetermined activation modes. In a first predetermined LED activation mode or an all LED activation mode, every one of the LEDs 13 is sequentially activated, and in a second predetermined LED activation mode or less-than-all LED sequential activation mode, only every one of a predetermined number of the LEDs is sequentially activated. In general, the fifth preferred embodiment first uses the all LED activation mode for either the vertically or horizontally positioned LEDs 13 and then applies the less-than-all LED activation mode. The fifth preferred embodiment subsequently switches back and forth between the above described activation modes between the vertically or horizontally positioned LEDs 13.

Still referring to FIG. 19, more specifically, in a step S71, each row of the LEDs 13 is alternately activated in the all or less-than-all LED activation mode, and the less-than-all activation mode is set to activate every other LEDs 13. In a step S72, it is determined whether or not corresponding ones of the phototransistors 14 detect the light interruption. When there is no detection of the light interruption in the step S72, the fifth preferred process proceeds back to the step S71 to repeat the above described alternate activation mode step. In contrast, when there is any detection of the light interruption in the step S72, every one of the LEDs 13 is sequentially activated in the all activation mode in a step S73. Based upon the two pairs of the values, LV_no_s and PV_no as well as LH_no_s and PH_no, the coordinates of the light interruption position are determined and then sent to the computer 5 in a step S74 as described with respect to the step S53 of the third preferred embodiment. In a subsequent step S75, it is determined whether or not next light interruption is found. If a next light interruption is found, the fifth preferred process repeats the above described step S74. On the other hand, if no light interruption is found in the step S75, the fifth preferred process proceeds back to the step S71 to repeat the entire process from the beginning.

In summary, when there is no detection of the light interruption in the step S75, the alternately switching activation mode is repeated for each row of the LEDs 13 in the step S71. For this reason, basically, the fifth preferred process is substantially similar to the fourth preferred process. However, since the preferred process alternately switches the activation modes prior to the detection of any light interruption, the probability of detecting the light interruption during the all LED activation increases. The above increased probability for the use of the all LED activation mode also increases the detection capability of the light interruption.

In the above described preferred embodiments, the coordinate input detection unit is integrated in the electronic blackboard system. However, alternative embodiments of the coordinate input detection unit 3 are not limited to the fixedly integrated arrangement and are optionally a detachably removable unit. Furthermore, the alternative embodiments are also optionally to determine coordinates in a three-dimensional space.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of detecting coordinates based upon two groups of opposing pairs of light emitting elements and light detecting elements, the two groups being perpendicularly positioned along two directions and surrounding a two-dimensional coordinate input and detection area for accepting an input from a pointing means, a plurality of the light detecting elements being placed in a light emitting area of each of the light emitting elements to accept light emitted from each of the light emitting elements in an overlapping manner, comprising the steps of:

sequentially and individually activating the light emitting elements within a predetermined time interval;

determining whether or not the light is interrupted along directions between activated one of the light emitting elements and the light detecting elements in the corresponding light emitting area of the activated light emitting element;

calculating two-dimensional coordinates for the input from the pointing means based upon the positions of the activated light emitting element and one or more of the light detecting elements that have detected the interruption of the light in the corresponding light emitting area, which define the interrupted light detecting elements.

2. The method of detecting coordinates according to claim 1 wherein said calculating step further includes additional steps of:

determining a central detector position of one or more of the interrupted light detecting elements;

determining a minimal distance between the central detector position and one of the interrupted light detecting elements for each group of the light emitting elements and the light detecting elements; and calculating two-dimensional coordinates for the input from the pointing means based upon the positional relation between the minimal distance and the central detector position.

3. The method of detecting coordinates according to claim 2 wherein said sequentially and individually activating step includes a continuously sequential activation mode for activating every one of the linearly placed light emitting elements and a discontinuously sequential activation mode for activating every Nth of the linearly placed light emitting elements, the discontinuously sequential activation mode being switched to the continuously sequential activation mode if it is determined that the input is placed in the coordinate input and detection area while the light emitting elements are activated in the discontinuously sequential activation mode, the continuously sequential activation mode being switched to the discontinuously sequential activation mode if it is determined that the input is not placed in the coordinate input and detection area while the light emitting elements are activated in the continuously sequential activation mode.

4. The method of detecting coordinates according to claim 2 wherein said sequentially and individually activating step includes a continuously sequential activation mode for activating every one of the linearly placed light emitting elements and an alternate sequential activation mode for alternating the activation of every one of the linearly placed light emitting elements and every Nth of the linearly placed light emitting elements, the alternate sequential activation mode being switched to the continuously sequential activation mode if it is determined that the input is placed in the coordinate input and detection area while the light emitting elements are activated in the discontinuously sequential activation mode, the continuously sequential activation mode being switched to the alternate sequential activation mode if it is determined that the input is not placed in the coordinate input and detection area while the light emitting elements are activated in the continuously sequential activation mode.

5. The method of detecting coordinates according to claim 1 wherein said sequentially and individually activating step includes a continuously sequential activation mode for activating every one of the linearly placed light emitting elements and a discontinuously sequential activation mode for activating every Nth of the linearly placed light emitting elements, the discontinuously sequential activation mode being switched to the continuously sequential activation mode if it is determined that the input is placed in the coordinate input and detection area while the light emitting elements are activated in the discontinuously sequential activation mode, the continuously sequential activation mode being switched to the discontinuously sequential activation mode if it is determined that the input is not placed in the coordinate input and detection area while the light emitting elements are activated in the continuously sequential activation mode.

6. The method of detecting coordinates according to claim 1 wherein said sequentially and individually activating step includes a continuously sequential activation mode for activating every one of the linearly placed light emitting elements and an alternate sequential activation mode for alternating the activation of every one of the linearly placed light emitting elements and every Nth of the linearly placed light emitting elements, the alternate sequential activation mode being switched to the continuously sequential activation mode if it is determined that the input is placed in the coordinate input and detection area while the light emitting elements are activated in the discontinuously sequential activation mode, the continuously sequential activation mode being switched to the alternate sequential activation mode if it is determined that the input is not placed in the coordinate input and detection area while the light emitting elements are activated in the continuously sequential activation mode.

7. A storage medium containing computer instructions for detecting coordinates based upon two groups of opposing pairs of light emitting elements and light detecting elements, the two groups being perpendicularly positioned along two directions and surrounding a two-dimensional coordinate input and detection area for accepting an input from a pointing means, a plurality of the light detecting elements being placed in a light emitting area of each of the light emitting elements to accept light emitted from each of the light emitting elements in an overlapping manner, the computer instructions performing the tasks of:

sequentially and individually activating the light emitting elements within a predetermined time interval;

determining whether or not the light is interrupted along directions between activated one of the light emitting elements and the light detecting elements in the corresponding light emitting area of the activated light emitting element;

calculating two-dimensional coordinates for the input from the pointing means based upon the positions of the activated light emitting element and one or more of the light detecting elements that have detected the interruption of the light in the corresponding light emitting area, which define the interrupted light detecting elements.

8. The storage medium containing computer instructions for detecting coordinates according to claim 7 wherein said calculating step further includes additional steps of:

determining a central detector position of one or more of the interrupted light detecting elements;

determining a minimal distance between the central detector position and one of the interrupted light detecting elements for each group of the light emitting elements and the light detecting elements; and calculating two-dimensional coordinates for the input from the pointing means based upon the positional relation between the minimal distance and the central detector position.

9. The storage medium containing computer instructions for detecting coordinates according to claim 8 wherein said sequentially and individually activating step includes a continuously sequential activation mode for activating every one of the linearly placed light emitting elements and a discontinuously sequential activation mode for activating every Nth of the linearly placed light emitting elements, the discontinuously sequential activation mode being switched to the continuously sequential activation mode if it is determined that the input is placed in the coordinate input and detection area while the light emitting elements are activated in the discontinuously sequential activation mode, the continuously sequential activation mode being switched to the discontinuously sequential activation mode if it is determined that the input is not placed in the coordinate input and detection area while the light emitting elements are activated in the continuously sequential activation mode.

10. The storage medium containing computer instructions for detecting coordinates according to claim 8 wherein said sequentially and individually activating step includes a continuously sequential activation mode for activating every one of the linearly placed light emitting elements and an alternate sequential activation mode for alternating the activation of every one of the linearly placed light emitting elements and every Nth of the linearly placed light emitting elements, the alternate sequential activation mode being switched to the continuously sequential activation mode if it is determined that the input is placed in the coordinate input and detection area while the light emitting elements are activated in the discontinuously sequential activation mode, the continuously sequential activation mode being switched to the alternate sequential activation mode if it is determined that the input is not placed in the coordinate input and detection area while the light emitting elements are activated in the continuously sequential activation mode.

11. The storage medium containing computer instructions for detecting coordinates according to claim 7 wherein said sequentially and individually activating step includes a continuously sequential activation mode for activating every one of the linearly placed light emitting elements and a discontinuously sequential activation mode for activating every Nth of the linearly placed light emitting elements, the discontinuously sequential activation mode being switched to the continuously sequential activation mode if it is determined that the input is placed in the coordinate input and detection area while the light emitting elements are activated in the discontinuously sequential activation mode, the continuously sequential activation mode being switched to the discontinuously sequential activation mode if it is determined that the input is not placed in the coordinate input and detection area while the light emitting elements are activated in the continuously sequential activation mode.

12. The storage medium containing computer instructions for detecting coordinates according to claim 7 wherein said sequentially and individually activating step includes a continuously sequential activation mode for activating every one of the linearly placed light emitting elements and an alternate sequential activation mode for alternating the activation of every one of the linearly placed light emitting elements and every Nth of the linearly placed light emitting elements, the alternate sequential activation mode being switched to the continuously sequential activation mode if it is determined that the input is placed in the coordinate input and detection area while the light emitting elements are activated in the discontinuously sequential activation mode, the continuously sequential activation mode being switched to the alternate sequential activation mode if it is determined that the input is not placed in the coordinate input and detection area while the light emitting elements are activated in the continuously sequential activation mode.

13. A system for detecting coordinates based upon two groups of opposing pairs of light emitting elements and light detecting elements, the two groups being perpendicularly positioned along two directions and surrounding a two-dimensional coordinate input and detection area for accepting an input from a pointing means, a plurality of the light detecting elements being placed in a light emitting area of each of the light emitting elements to accept light emitted from each of the light emitting elements in an overlapping manner, comprising:
 a light emitting control for sequentially and individually activating the light emitting elements within a predetermined time interval;
 an interruption determination unit connected to said light emitting control for determining whether or not the light is interrupted along directions between activated one of the light emitting elements and the light detecting elements in the corresponding light emitting area of the activated light emitting element;
 a coordinate calculation unit connected to said determination unit for calculating two-dimensional coordinates for the input from the pointing means based upon the positions of the activated light emitting element and one or more of the light detecting elements that have detected the interruption of the light in the corresponding light emitting area, which define the interrupted light detecting elements.

14. The system for detecting coordinates according to claim 13 wherein said coordinate calculation unit further comprises:
 a central position determination unit for determining a central detector position of one or more of the interrupted light detecting elements;
 a minimal distance determination unit connected to said central position determination unit for determining a minimal distance between the central detector position and one of the interrupted light detecting elements for each group of the light emitting elements and the light detecting elements; and
 a calculation unit connected to said minimal distance determination unit for calculating two-dimensional coordinates for the input from the pointing means based upon the positional relation between the minimal distance and the central detector position.

15. The system for detecting coordinates according to claim 14 wherein said light emitting control activates every one of the linearly placed light emitting elements in a continuously sequential activation mode and every Nth of the linearly placed light emitting elements in a discontinuously sequential activation mode, the discontinuously sequential activation mode being switched to the continuously sequential activation mode if said interruption determination unit determines that the input is placed in the coordinate input and detection area while the light emitting elements are activated in the discontinuously sequential activation mode, the continuously sequential activation mode being switched to the discontinuously sequential activation mode if said interruption determination unit determines that the input is not placed in the coordinate input and detection area while the light emitting elements are activated in the continuously sequential activation mode.

16. The system for detecting coordinates according to claim 14 wherein said light emitting control activates every one of the linearly placed light emitting elements in a continuously sequential activation mode and every Nth or every one of the linearly placed light emitting elements in an alternate sequential activation mode, the alternate sequential activation mode being switched to the continuously sequential activation mode if said interruption determination unit determines that the input is placed in the coordinate input and detection area while the light emitting elements are activated in the alternate sequential activation mode, the continuously sequential activation mode being switched to the alternate sequential activation mode if said interruption determination unit determines that the input is not placed in the coordinate input and detection area while the light emitting elements are activated in the continuously sequential activation mode.

17. The system for detecting coordinates according to claim 13 wherein said light emitting control activates every one of the linearly placed light emitting elements in a continuously sequential activation mode and every Nth of the linearly placed light emitting elements in a discontinuously sequential activation mode, the discontinuously sequential activation mode being switched to the continuously sequential activation mode if said interruption determination unit determines that the input is placed in the coordinate input and detection area while the light emitting elements are activated in the discontinuously sequential activation mode, the continuously sequential activation mode being switched to the discontinuously sequential activation mode if said interruption determination unit determines that the input is not placed in the coordinate input and detection area while the light emitting elements are activated in the continuously sequential activation mode.

18. The system for detecting coordinates according to claim 13 wherein said light emitting control activates every one of the linearly placed light emitting elements in a continuously sequential activation mode and every Nth or every one of the linearly placed light emitting elements in an alternate sequential activation mode, the alternate sequential activation mode being switched to the continuously sequential activation mode if said interruption determination unit determines that the input is placed in the coordinate input and detection area while the light emitting elements are activated in the alternate sequential activation mode, the continuously sequential activation mode being switched to the alternate sequential activation mode if said interruption determination unit determines that the input is not placed in the coordinate input and detection area while the light emitting elements are activated in the continuously sequential activation mode.

* * * * *